(12) United States Patent
Speasl et al.

(10) Patent No.: US 11,481,854 B1
(45) Date of Patent: Oct. 25, 2022

(54) PROPERTY MEASUREMENT WITH AUTOMATED DOCUMENT PRODUCTION

(71) Applicant: ImageKeeper LLC, Las Vegas, NV (US)

(72) Inventors: Jerry Speasl, Las Vegas, NV (US); Marc Roberts, St. Louis, MO (US); Mike Patterson, Sherman, TX (US)

(73) Assignee: ImageKeeper LLC, Las Vegas, NV (US)

( * ) Notice: Subject to any disclaimer, the term of this patent is extended or adjusted under 35 U.S.C. 154(b) by 1393 days.

(21) Appl. No.: 15/051,569

(22) Filed: Feb. 23, 2016

Related U.S. Application Data

(60) Provisional application No. 62/119,703, filed on Feb. 23, 2015.

(51) Int. Cl.
| | |
|---|---|
| *G06Q 40/00* | (2012.01) |
| *G06Q 50/16* | (2012.01) |
| *G01S 19/14* | (2010.01) |
| *G06Q 40/08* | (2012.01) |
| *G06Q 50/26* | (2012.01) |

(52) U.S. Cl.
CPC .............. *G06Q 50/16* (2013.01); *G01S 19/14* (2013.01); *G06Q 40/08* (2013.01); *G06Q 50/26* (2013.01)

(58) Field of Classification Search
CPC ...... G06Q 40/00; H04N 1/00127; G01C 9/00; G01C 22/00; G01C 23/00; G01C 3/00; G01C 5/00
USPC ............................................................ 705/4
See application file for complete search history.

(56) References Cited

U.S. PATENT DOCUMENTS

| | | | |
|---|---|---|---|
| 4,876,597 A | 10/1989 | Roy et al. | |
| 5,343,527 A | 8/1994 | Moore | |
| 5,553,609 A | 9/1996 | Chen et al. | |
| 5,737,491 A | 4/1998 | Allen et al. | |

(Continued)

FOREIGN PATENT DOCUMENTS

| | | |
|---|---|---|
| CN | 108040050 | 5/2018 |
| CN | 109460732. | 3/2019 |

(Continued)

OTHER PUBLICATIONS

U.S. Appl. No. 15/052,774, Jerry Speasl, Secure Digital Data Collection, filed Feb. 24, 2016.

(Continued)

*Primary Examiner* — Ojo O Oyebisi
(74) *Attorney, Agent, or Firm* — Polsinelli LLP

(57) ABSTRACT

Global positioning system (GPS) receivers, along with a user device with a camera, can be used to determine an elevation of a point of interest on or within a structure. The user device and a first GPS receiver can be located somewhere outside the structure from which the structure is clearly visible. A second GPS receiver can be located on, within, or near the structure. The user device receives location data from both GPS receivers and calculates a distance between the two. The user device then takes a digital photograph in which structure is visible and notes the photo capture angle. The user device then calculates the elevation of the point of interest trigonometrically using the calculated GPS distance and the photo angle. The user device can then automatically insert this information into associated documentation and transmit the same.

21 Claims, 17 Drawing Sheets

(56) References Cited

U.S. PATENT DOCUMENTS

| | | | |
|---|---|---|---|
| 6,038,295 | A | 3/2000 | Mattes |
| 6,122,526 | A | 9/2000 | Parulski et al. |
| 6,182,219 | B1 | 1/2001 | Feldbau et al. |
| 6,256,059 | B1 | 7/2001 | Fichtner |
| 6,278,466 | B1 | 8/2001 | Chen et al. |
| 6,304,211 | B1* | 10/2001 | Boman ............. A63B 24/0021 |
| | | | 701/470 |
| 6,370,568 | B1 | 4/2002 | Garfinkle |
| 6,584,564 | B2 | 6/2003 | Olkin et al. |
| 6,662,226 | B1 | 12/2003 | Wang et al. |
| 6,751,454 | B2 | 6/2004 | Thornton |
| 6,784,925 | B1 | 8/2004 | Tomat et al. |
| 6,847,334 | B2 | 1/2005 | Hayhurst et al. |
| 6,995,789 | B2 | 2/2006 | Mcintyre et al. |
| 7,028,184 | B2 | 4/2006 | Hind et al. |
| 7,034,880 | B1 | 4/2006 | Endsley et al. |
| 7,170,551 | B2 | 1/2007 | Fichtner |
| 7,188,307 | B2 | 3/2007 | Ohsawa |
| 7,239,346 | B1 | 7/2007 | Priddy |
| 7,343,049 | B2 | 3/2008 | Bulterworth |
| 7,526,718 | B2 | 4/2009 | Samadani et al. |
| 8,224,178 | B2 | 7/2012 | Keane |
| 8,634,712 | B1 | 1/2014 | Mullins |
| 9,094,543 | B2 | 4/2015 | Mullins |
| 9,538,336 | B2* | 1/2017 | Rudow ................. H04W 4/029 |
| 10,048,378 | B2* | 8/2018 | Gogol .................. G01C 15/002 |
| 10,101,465 | B2* | 10/2018 | Loomis ................... G01S 19/43 |
| 10,282,562 | B1 | 5/2019 | Speasl |
| 10,318,110 | B2 | 6/2019 | Naaman et al. |
| 10,360,705 | B2 | 7/2019 | Cervelli et al. |
| 10,444,941 | B2 | 10/2019 | Cervelli et al. |
| RE48,867 | E | 12/2021 | Schneider |
| 11,212,416 | B2 | 12/2021 | Speasl |
| 11,227,070 | B2 | 1/2022 | Speasl |
| 2002/0108118 | A1 | 8/2002 | Cohen et al. |
| 2002/0122568 | A1 | 9/2002 | Zhao |
| 2002/0147618 | A1 | 10/2002 | Mezrah et al. |
| 2002/0186412 | A1* | 12/2002 | Murashita .......... H04N 1/32128 |
| | | | 358/1.16 |
| 2003/0085989 | A1 | 5/2003 | Tay |
| 2004/0012811 | A1 | 1/2004 | Nakayama |
| 2004/0174434 | A1 | 9/2004 | Walker et al. |
| 2004/0217884 | A1 | 11/2004 | Samadani et al. |
| 2004/0218894 | A1 | 11/2004 | Harville et al. |
| 2004/0218895 | A1 | 11/2004 | Samadani et al. |
| 2004/0218910 | A1 | 11/2004 | Chang et al. |
| 2004/0221227 | A1 | 11/2004 | Wu |
| 2004/0264542 | A1 | 12/2004 | Kientz |
| 2005/0036034 | A1 | 2/2005 | Rea et al. |
| 2005/0062851 | A1 | 5/2005 | Silverbrook et al. |
| 2005/0110880 | A1 | 5/2005 | Parulski et al. |
| 2005/0114459 | A1 | 5/2005 | Tu et al. |
| 2006/0105806 | A1 | 5/2006 | Vance et al. |
| 2006/0114338 | A1 | 6/2006 | Rothschild |
| 2006/0248348 | A1 | 11/2006 | Wakao et al. |
| 2007/0008321 | A1 | 1/2007 | Gallagher et al. |
| 2007/0063033 | A1 | 3/2007 | Silverbrook et al. |
| 2007/0073937 | A1 | 3/2007 | Feinberg et al. |
| 2007/0074035 | A1 | 3/2007 | Scanlon et al. |
| 2008/0101784 | A1 | 5/2008 | Hsu |
| 2008/0219658 | A1 | 9/2008 | Keane et al. |
| 2008/0305856 | A1 | 12/2008 | Walker et al. |
| 2009/0031425 | A1 | 1/2009 | Basson et al. |
| 2011/0137561 | A1* | 6/2011 | Kankainen ................ G06T 7/60 |
| | | | 701/300 |
| 2011/0235923 | A1* | 9/2011 | Weisenburger ........ G01C 15/00 |
| | | | 382/201 |
| 2011/0276423 | A1 | 11/2011 | Davidson |
| 2012/0086971 | A1 | 4/2012 | Bisbee et al. |
| 2013/0046461 | A1* | 2/2013 | Balloga ................. G01S 7/4972 |
| | | | 701/438 |
| 2013/0080051 | A1* | 3/2013 | Gribkov ............... G01C 21/005 |
| | | | 701/468 |
| 2014/0049653 | A1 | 2/2014 | Leonard et al. |
| 2014/0114691 | A1 | 4/2014 | Pearce |
| 2014/0125822 | A1 | 5/2014 | Mullins |
| 2014/0152854 | A1 | 6/2014 | Iwaki et al. |
| 2014/0176733 | A1 | 6/2014 | Drooker et al. |
| 2014/0281520 | A1* | 9/2014 | Selgas ................... H04L 9/0825 |
| | | | 713/165 |
| 2014/0300722 | A1 | 10/2014 | Garcia |
| 2014/0304184 | A1 | 10/2014 | Fletcher |
| 2015/0098021 | A1 | 4/2015 | O'Sullivan et al. |
| 2015/0312227 | A1* | 10/2015 | Follis .................... H04L 63/126 |
| | | | 713/176 |
| 2015/0334257 | A1 | 11/2015 | Woods |
| 2016/0042767 | A1 | 2/2016 | Araya et al. |
| 2016/0138919 | A1* | 5/2016 | Green ..................... G06T 17/00 |
| | | | 348/135 |
| 2016/0169856 | A1* | 6/2016 | Sung ..................... G01V 11/00 |
| | | | 703/10 |
| 2016/0210734 | A1 | 7/2016 | Kass et al. |
| 2017/0140492 | A1 | 5/2017 | Leonard et al. |
| 2018/0357632 | A1 | 12/2018 | Jammikunta et al. |
| 2019/0325164 | A1 | 10/2019 | Speasl |
| 2020/0014816 | A1 | 1/2020 | Speasl |
| 2020/0151363 | A1 | 5/2020 | Speasl |
| 2020/0184465 | A1 | 6/2020 | Kislev et al. |
| 2020/0403796 | A1 | 12/2020 | Solar |
| 2021/0150066 | A1 | 5/2021 | Speasl |
| 2021/0312561 | A1 | 10/2021 | Speasl |
| 2021/0400161 | A1 | 12/2021 | Alrahaili |
| 2022/0004666 | A1 | 1/2022 | Speasl |
| 2022/0070330 | A1 | 3/2022 | Speasl |
| 2022/0116511 | A1 | 4/2022 | Speasl |

FOREIGN PATENT DOCUMENTS

| | | |
|---|---|---|
| CN | 110866224 | 3/2020 |
| WO | WO 2020/010355 | 1/2020 |

OTHER PUBLICATIONS

U.S. Appl. No. 15/052,774 Office Action dated Aug. 7, 2017.
U.S. Appl. No. 15/052,774 Final Office Action dated Jun. 1, 2018.
U.S. Appl. No. 16/505,305, Jerry Speasl, Secure Digital Media Capture and Analysis, filed Jul. 8, 2019.
PCT/US19/40852, Secure Digital Media Capture and Analysis, Jul. 8, 2019.
PCT Application No. PCT/US2019/040852 International Search Report and Written Opinion dated Oct. 22, 2019.
U.S. Appl. No. 16/399,785 Office Action dated Aug. 9, 2019.
U.S. Appl. No. 16/741,605 Final Office Action dated Jul. 24, 2020.
U.S. Appl. No. 16/505,305 Office Action dated Jul. 22, 2020.
U.S. Appl. No. 16/741,605 Office Action dated Mar. 20, 2020.
U.S. Appl. No. 16/399,785 Final Office Action dated Nov. 6, 2020.
U.S. Appl. No. 16/505,305 Final Office Action dated Nov. 17, 2020.
PCT Application No. PCT/US2019/040852 International Preliminary Report on Patentability dated Jan. 12, 2021.
U.S. Appl. No. 16/505,305 Office Action dated Mar. 3, 2021.
U.S. Appl. No. 17/162,629 Office Action dated Oct. 18, 2021.
U.S. Appl. No. 17/556,071, Jerry Speasl, Secure Digital Media Capture and Analysis, filed Dec. 20, 2021.
U.S. Appl. No. 17/008,568 Office Action dated Mar. 9, 2022.
U.S. Appl. No. 11/715,049 Office Action dated Dec. 14, 2011.
U.S. Appl. No. 11/715,049 Final Office Action dated Jul. 8, 2011.
U.S. Appl. No. 11/715,049 Office Action dated Jun. 12, 2009.
U.S. Appl. No. 13/491,026 Office Action dated Mar. 5, 2013.
U.S. Appl. No. 14/154,156 Office Action dated Feb. 28, 2014.
U.S. Appl. No. 14/809,068 Office Action dated Dec. 18, 2015.

* cited by examiner

FIG. 4A

ELEVATION CERTIFICATE FORM 410

FIG. 4B

ELEVATION CERTIFICATE FORM 420

ELEVATION CERTIFICATE, page 2

IMPORTANT: In these spaces, copy the corresponding information from Section A.

Building Street Address (including Apt., Unit, Suite, and/or Bldg. No.) or P.O. Route and Box No.

City  State  ZIP Code

FOR INSURANCE COMPANY USE
Policy Number
Company NAIC Number

SECTION D – SURVEYOR, ENGINEER, OR ARCHITECT CERTIFICATION (CONTINUED)

Copy both sides of this Elevation Certificate for (1) community official, (2) insurance agent/company, and (3) building owner.

Comments

Signature  Date

SECTION E – BUILDING ELEVATION INFORMATION (SURVEY NOT REQUIRED) FOR ZONE AO AND ZONE A (WITHOUT BFE)

For Zones AO and A (without BFE), complete Items E1–E5. If the Certificate is intended to support a LOMA or LOMR-F request, complete Sections A, B, and C. For Items E1–E4, use natural grade, if available. Check the measurement used. In Puerto Rico only, enter meters.

E1. Provide elevation information for the following and check the appropriate boxes to show whether the elevation is above or below the highest adjacent grade (HAG) and the lowest adjacent grade (LAG).
  a) Top of bottom floor (including basement, crawlspace, or enclosure) is ___  ☐ feet ☐ meters ☐ above or ☐ below the HAG
  b) Top of bottom floor (including basement, crawlspace, or enclosure) is ___  ☐ feet ☐ meters ☐ above or ☐ below the LAG E2. For Building Diagrams 6–9 with permanent flood openings provided in Section A Items 8 and/or 9 (see pages 8–9 of Instructions), the next higher floor (elevation C2.b in the diagrams) of the building is ___  ☐ feet ☐ meters ☐ above or ☐ below the HAG.

E3. Attached garage (top of slab) is ___  ☐ feet ☐ meters ☐ above or ☐ below the HAG.

E4. Top of platform of machinery and/or equipment servicing the building is ___  ☐ feet ☐ meters ☐ above or ☐ below the HAG.

E5. Zone AO only: If no flood depth number is available, is the top of the bottom floor elevated in accordance with the community's floodplain management ordinance? ☐ Yes ☐ No ☐ Unknown. The local official must certify this information in Section G.

SECTION F – PROPERTY OWNER (OR OWNER'S REPRESENTATIVE) CERTIFICATION

The property owner or owner's authorized representative who completes Sections A, B, and E for Zone A (without a FEMA-issued or community-issued BFE) or Zone AO must sign here. The statements in Sections A, B, and E are correct to the best of my knowledge.

Property Owner or Owner's Authorized Representative's Name

Address  City  State  ZIP Code

Signature  Date  Telephone

Comments

☐ Check here if attachments.

SECTION G – COMMUNITY INFORMATION (OPTIONAL)

The local official who is authorized by law or ordinance to administer the community's floodplain management ordinance can complete Sections A, B, C (or E), and G of this Elevation Certificate. Complete the applicable item(s) and sign below. Check the measurement used in Items G8–G10. In Puerto Rico only, enter meters.

G1. ☐ The information in Section C was taken from other documentation that has been signed and sealed by a licensed surveyor, engineer, or architect who is authorized by law to certify elevation information. (Indicate the source and date of the elevation data in the Comments area below.)
G2. ☐ A community official completed Section E for a building located in Zone A (without a FEMA-issued or community-issued BFE) or Zone AO.
G3. ☐ The following information (Items G4–G10) is provided for community floodplain management purposes.

| G4. Permit Number | G5. Date Permit Issued | G6. Date Certificate Of Compliance/Occupancy Issued |
|---|---|---|

G7. This permit has been issued for: ☐ New Construction ☐ Substantial Improvement
G8. Elevation of as-built lowest floor (including basement) of the building: ___  ☐ feet ☐ meters Datum ___
G9. BFE or (in Zone AO) depth of flooding at the building site: ___  ☐ feet ☐ meters Datum ___
G10. Community's design flood elevation: ___  ☐ feet ☐ meters Datum ___

Local Official's Name  Title

Community Name  Telephone

Signature  Date

Comments

☐ Check here if attachments

FEMA Form 086-0-33 (Revised 7/12)  Replaces all previous editions.

ELEVATION CERTIFICATE FORM 430

FRONT VIEW 440

REAR VIEW 445

PROPERTY MEASUREMENT WITH AUTOMATED DOCUMENT PRODUCTION

CROSS-REFERENCE TO RELATED APPLICATIONS

The present application claims the priority benefit of U.S. provisional application No. 62/119,703 filed Feb. 23, 2015, the disclosure of which is incorporated herein by reference.

BACKGROUND

Field of Invention

The present invention generally relates to property measurement. More specifically, the present invention relates to computerized tools for measuring points of interest within a property and generating associated documentation.

Description of the Related Art

Determining the elevation of a structure (e.g., a home, building, tower, or sculpture), or of a particular portion of a structure (e.g., sea level or another elevation point potentially significant for flood risk) for governmental or flood insurance rating purposes has traditionally been performed by a surveyor or survey team. Starting from a known benchmark, the survey team foresights or back-sights to the property in question and notes the rise or fall in elevation along the way. A prominent location on a lot next to the structure in question is typically chosen by the survey team and accurately geo-located using map coordinates. Next, the elevation is determined for the chosen location based upon the multitude of measurements taken from a reference benchmark location with a known elevation. Subsequent structure measurements, such as the height of the first floor, second floor, split-level, or basement floor are referenced from the chosen prominent location.

Once the surveyor or the survey team completes their measurements, these measurements are typically entered into paper-based documents such as the Federal Emergency Management Agency (FEMA) "Elevation Certificate" document. The Elevation Certificate must then be certified by the engineer or surveyor responsible for taking the measurements. Photographs showing the structure are also typically taken and attached to the Elevation Certificate. The Elevation Certificate is then provided to an insurance underwriter where the measurements are reviewed and appropriate rate information is determined utilizing flood premium charts provided by a government entity.

This traditional process of measuring the property is time-consuming, cumbersome, and difficult. This is in addition to the concerns of inaccuracy and error if the surveying process is done incorrectly. This process must also be performed by surveyors or individuals with experience surveying property. This means that conducting the survey can also be costly due to hiring costs of qualified surveyors. The survey can also be delayed due to unavailability of qualified surveyors on a particular date or in a particular region. The filling out of documents is equally time consuming and offers the possibility for error in transcription as well as loss of documentation, especially originals or certified forms.

There is a need in the art for improved systems and methods for conducting property measurement and associated document workflow.

SUMMARY OF THE CLAIMED INVENTION

One exemplary method for property measurement includes receiving a first location from a first global positioning system (GPS) receiver located near a user device. The method also includes receiving a second location from a second global positioning system (GPS) receiver located near a structure. The method also includes calculating a distance between the first location and the second location. The method also includes receiving a digital photograph depicting at least one side of the structure and a point of interest that is part of the structure. The method also includes calculating an elevation of the point of interest using the digital photograph and the calculated distance. The method also includes storing the calculated elevation of the point of interest in a memory of the user device. The method also includes generating an electronic document that includes the calculated elevation of the point of interest.

One exemplary system for property measurement includes a first global positioning system (GPS) receiver. The system also includes a second global positioning system (GPS) receiver located near a structure. The system also includes a communication transceiver. The system also includes a camera module. The system also includes a memory. The system also includes a processor coupled to the memory and the camera module and the communication transceiver. Execution of instructions stored in the memory by the processor performs a number of system operations. The system operations include receiving a first location from a first global positioning system (GPS) receiver at the communication transceiver. The system operations also include receiving a second location from a second global positioning system (GPS) receiver at the communication transceiver. The system operations also include calculating a distance between the first location and the second location. The system operations also include receiving a digital photograph from the camera module, the digital photograph depicting at least one side of the structure and a point of interest that is part of the structure. The system operations also include calculating an elevation of the point of interest using the digital photograph and the calculated distance. The system operations also include storing the calculated elevation of the point of interest in a memory of the user device. The system operations also include generating an electronic document that includes the calculated elevation of the point of interest.

One exemplary non-transitory computer-readable storage medium may have embodied thereon a program executable by a processor to perform a method for property measurement. The exemplary program method includes receiving a first location from a first global positioning system (GPS) receiver located near a user device. The program method also includes receiving a second location from a second global positioning system (GPS) receiver located near a structure. The program method also includes calculating a distance between the first location and the second location. The program method also includes receiving a digital photograph depicting at least one side of the structure and a point of interest that is part of the structure. The program method also includes calculating an elevation of the point of interest using the digital photograph and the calculated distance. The program method also includes storing the calculated elevation of the point of interest in a memory of the user device. The program method also includes generating an electronic document that includes the calculated elevation of the point of interest.

BRIEF DESCRIPTION OF THE DRAWINGS

FIG. 4A illustrates a first exemplary page of an exemplary Elevation Certificate prior to being filled in with information from measurements.

FIG. 4B illustrates a second exemplary page of an exemplary Elevation Certificate prior to being filled in with information from measurements.

DETAILED DESCRIPTION

Two global positioning system (GPS) receivers along with a user device with a camera (e.g., a smartphone or tablet) can be used to determine an elevation of a point of interest on or within a structure. The user device and first GPS receiver can be located somewhere outside the structure from which the structure is clearly visible. The second GPS receiver can be located on, within, or near the structure. The user device receives location data from both GPS receivers and calculates a distance between the two receivers. The user device then takes a digital photograph in which structure is visible and notes the photo capture angle. The user device then trigonometrically calculates the elevation of the point of interest using the calculated GPS distance and the photo angle. The user device can then automatically insert this into a document (e.g., a FEMA Elevation Certificate) and transmit said document to a requisite locale or device.

Figure 1A:
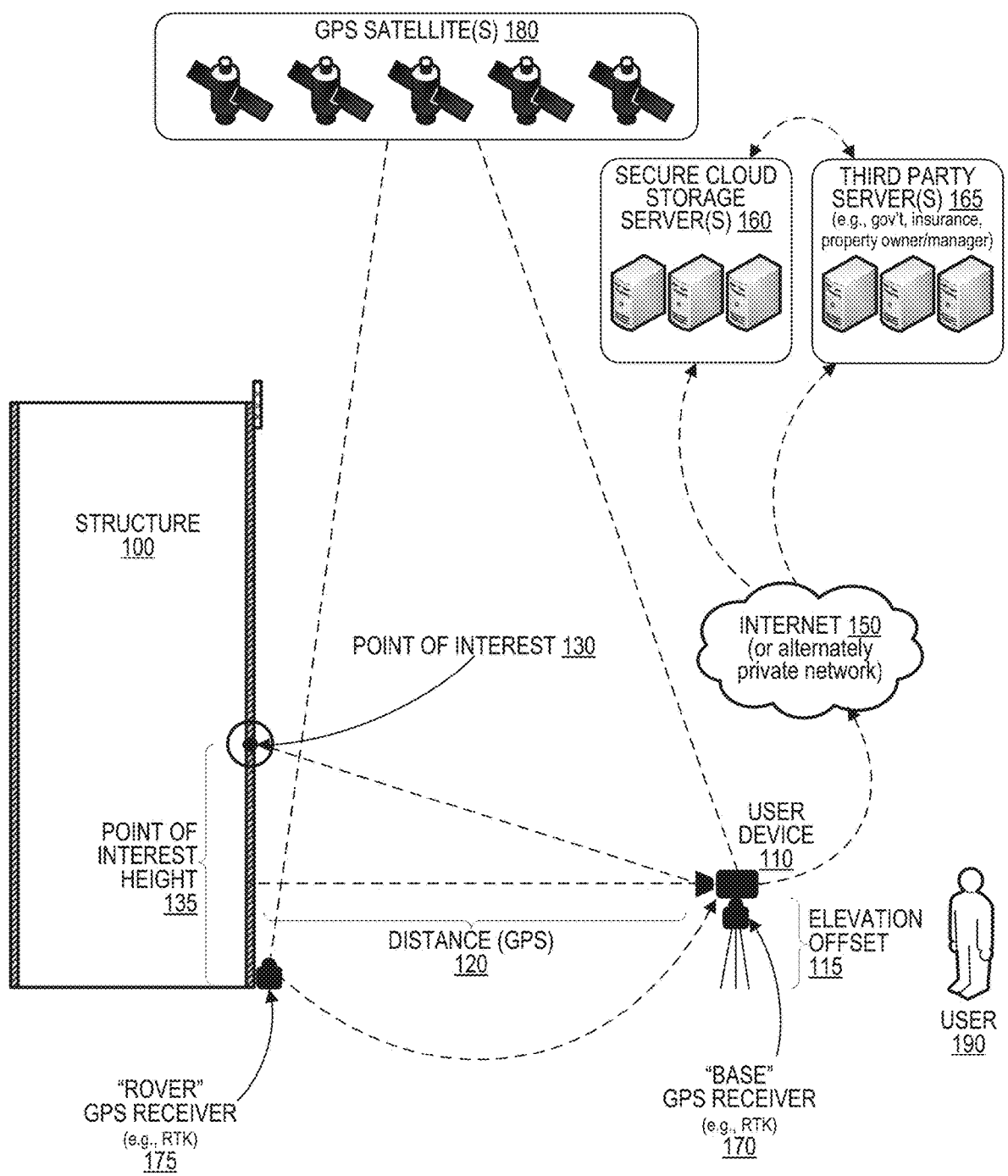
FIG. 1A illustrates a user device with a camera module and two global positioning system (GPS) receivers determining an elevation of a point of interest on a structure that is located above the user device.

FIG. 1A illustrates a user device with a camera module and two global positioning system (GPS) receivers determining an elevation of a point of interest on a structure that is located above the user device. Structure 100 may be a building such as an office building, warehouse, factory, power plant, hangar, or garage. Structure 100 may also be a home that is freestanding or within a complex. Structure 100 is also exemplified by the likes of a tower or tower-like object such as a radio tower, a cell phone tower, or lighthouse. Structure 100 could also be a piece of art such as a statue or modern art installation. Organic structures such as a tree or any other type of measureable structure such as a wind turbine could be representative of structure 100.

The point of interest 130 may be located anywhere along a face of the structure or within a structure 100. For example, the point of interest 130 may represent a particular floor such as one with structural issues. Point of interest 130 could also be a particular elevation at which the structure 100 may face flood dangers or any other point or elevation that may be useful or necessary to measure.

A user 190 is illustrated in FIG. 1A conducting an elevation measurement using a user device 110. User device 110 may be digital in nature and could encompass a smartphone, a tablet device, a laptop computer, a wearable device, a component coupled to or a part of a portable gaming console, a portable media player device, a still-camera device, a video camera device, or some combination thereof. User device 110 operates in concert with a pair of GPS receivers: base receiver 170 and rover receiver 175. The user device 110 is further described in FIG. 2. The GPS receivers 170/175 are further described in FIG. 3. The terminology "base GPS receiver" 170 and "rover GPS receiver" 175 is not meant to imply different functionalities. For example, functionality would not suffer if the positions of said receivers were reversed. In some cases, the "base" GPS receiver 170 may incorporated into the user device 110.

Figure 4A:
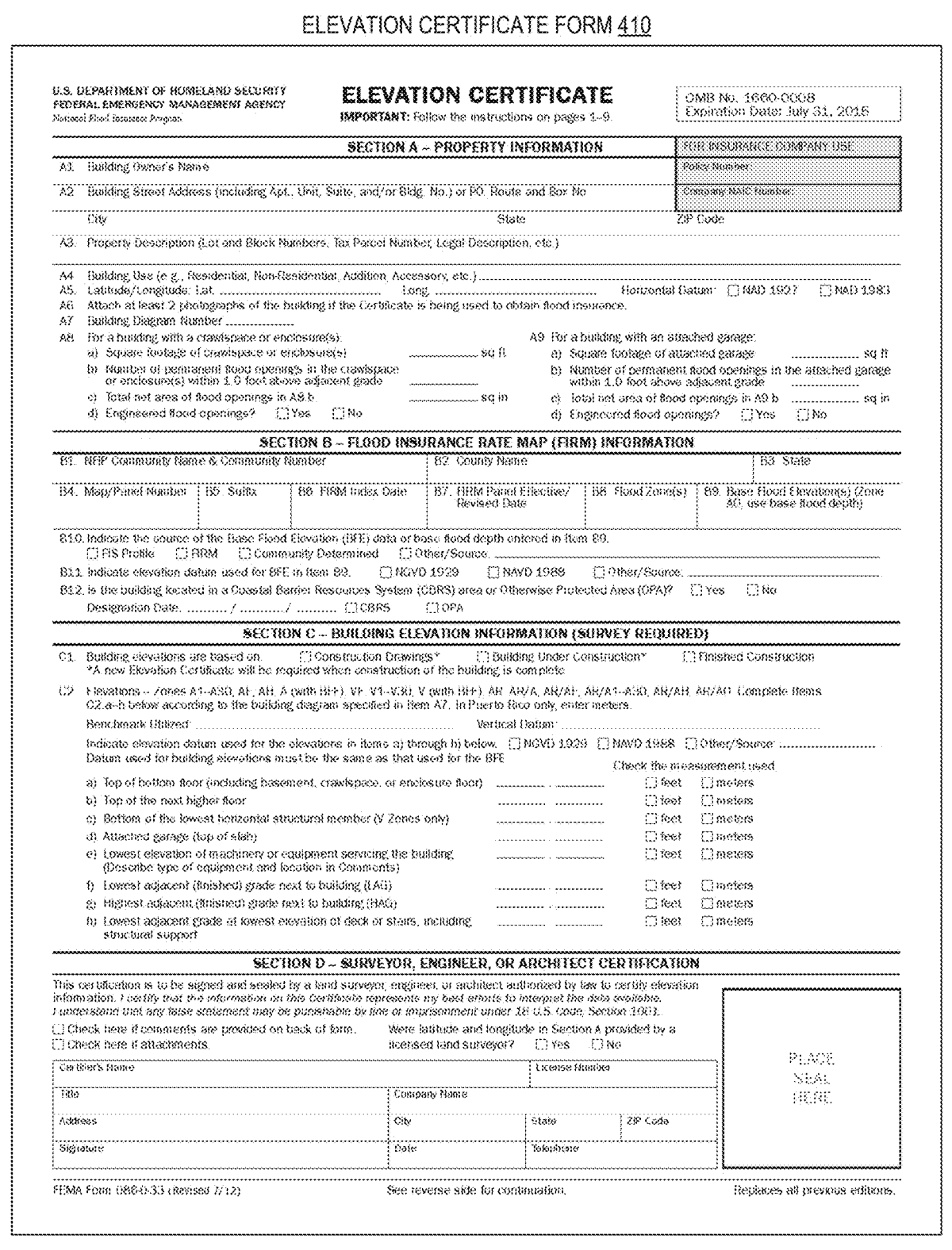
Figure 4C:
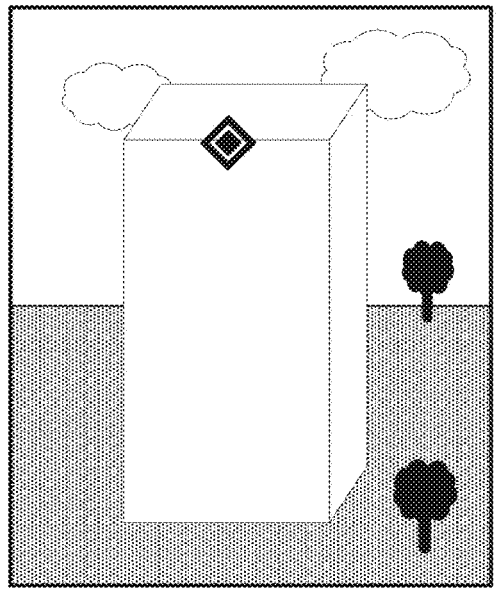
FIG. 4C illustrates a third exemplary page of an exemplary Elevation Certificate that has been filled in with information from measurements.
Figure 4C:
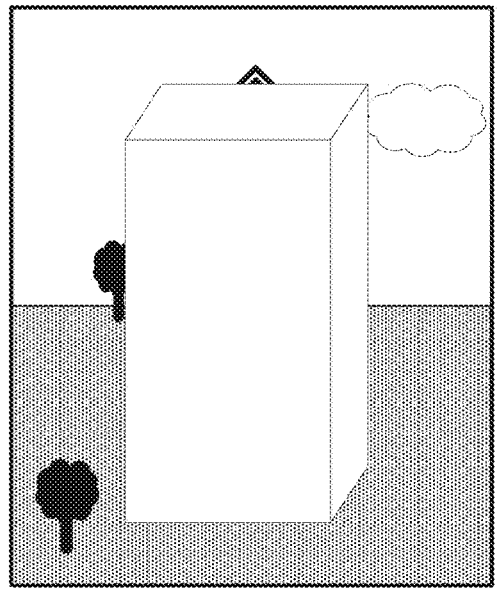

Measurements completed by the user device 110 in concert with the GPS receivers 170/175 are used to automatically generate a document. The document might be a Federal Emergency Management Agency (FEMA) "Elevation Certificate" form as illustrated in FIGS. 4A, 4B, and 4C. The document could alternatively be an insurance form that can encompass a universe of documents such as a claim form, a surveying form, an appraisal form, or an approval form. Measurement values are automatically populated into the associated fields of the form and transferred from the user device 110 through a network connection 150 such as the Internet and to a secure cloud storage server 160. This information may additionally (or alternately) be supplied to one or more servers associated with a third party 165. These third-party servers 165 could include a government entity (e.g., FEMA), an insurance company/underwriter, a property owner, a property manager, or some combination thereof.

The user 190 conducting the elevation measurement does not need to be a surveyor or engineer in order to perform the measurements. The user 190 can use a software application 290 executed on their user device 110 as part of the measuring process. The user first deploys the "base" global positioning system (GPS) receiver 170 and the "rover" GPS receiver 175. One or both of the GPS receivers 170/175 may be specialized GPS receivers incorporating Real Time Kinematics (RTK) technology and/or Real Time Network (RTN) technology for greater accuracy. One or both of the GPS receivers 170/175 could additionally or alternatively incorporate additional sensors such as accelerometers, Wi-Fi network-based positioning componentry, and cell-tower triangulation positioning componentry for additional accuracy. One or both GPS receivers 170/175 may be capable of measuring elevation in addition to latitude and longitude.

One or both of the GPS receivers 170/175 are mounted on a base, mount, tripod, or object of a known height, which is then being used as an elevation offset 115. The "base" GPS receiver 170 is generally placed on a prominent location on the property that is associated with the structure 100 in question. Said receiver 170 is in clear view of the sky such that sufficient signal reception with a GPS satellite 180 is present. While not shown in FIG. 1, the base GPS receiver 170 may, in some instances, include a laser pointed evenly and horizontally: parallel to the ground, perpendicular to a face of the structure 100, or parallel to a plane indicating sea level. Such positioning is determined using a level, gyroscope, and/or accelerometer coupled to the laser pointer device generating the aforementioned laser to mark a point on the structure 100 at the elevation offset 115. The laser may, for example, follow a path similar or parallel to the line marked "distance (GPS) 120" in FIGS. 1A and 1B.

The "rover" receiver 175 is located at, or next to, a relevant reference point for a structure 100. For example, the second "rover" GPS receiver 175 can be placed near or atop a bottom floor of the structure 100, inside a crawl space or basement of the structure 100, at a foundation of the structure 100, at a pier extending from the structure 100, or at a similar reference point. The rover GPS receiver 175 can also, in some cases, be placed on a tripod, rod, or other object of known height (i.e, the elevation offset 115).

The base (prominent location) GPS receiver 170 and the rover (structure 100 reference) GPS receiver 175 communicates with the software application 290 running on the user device 110. Such communication may be over a wired network whereby , the base GPS receiver 170 may be coupled to the user device 110 with one or more cables such as USB cables. The connection may also be a wireless connection, including but not limited to Bluetooth, Bluetooth Low Energy, Bluetooth Smart, 3G, 4G, LTE, Wi-Fi, Wi-Fi direct, Radio Frequency Communication, or Near-Field Communication, or some combination thereof.

In any event, both the base GPS receiver 170 and the rover GPS receiver 175 each communicate their precise locations and/or elevations to the user device 110. Utilizing a camera module 210 of the user device 110, a user device 110 software application 290 then instructs the user 190 to take a series of one or more digital images from the base GPS receiver 170 (at the prominent location) to the rover GPS receiver 175 (at the structure 100 reference point) whereby the distance, height, and angles can be calculated using the application 290 to arrive at the correct elevation measurements required for a valid Federal Emergency Management Agency (FEMA) Elevation Certificate or other type of document.

The series of digital images that the user device application 290 instructs the User 190 to take may be used to calculate the height of the structure 100, among other values. These values can be inserted in the document (e.g., FEMA Elevation Certificate form or other document). The government may, in some cases, require a clear photo to be included with the FEMA Elevation Certificate. The user 190 can be instructed to acquire one or more photos of the structure 100 in question. These photos can be used not only to satisfy the government requirement for underwriting (for example) flood risk, but to mechanically obtain clear line of sight of the entire structure 100 with view of the point of measurement (lowest point adjacent to a concrete slab, for example) not obscured by landscaping (bushes or tall grass.

In one embodiment, the user 190 would take at least eight photos of a structure 100 (assuming each photo had a clear view) starting with a photo of each corner of the structure 100 and additional photos depicting the center of each wall of the structure 100. In some embodiments, it may suffice for the user to take one photo (e.g., a front photo 440) or two photos (e.g., a front photo 440 and a rear photo 445 as illustrated in FIG. 4C), or another number of photos fewer than eight photos. In some embodiments, the user 190 may take more than eight photos.

The user device application 290 can thus be used to precisely provide a height measurement 135 of a point of interest 130 of the structure 100 by making calculations based on the photos taken by the user 190. In some embodiments, one or both GPS receivers 170/175 provide a precise location in three axes (X, Y, and Z or Latitude/Longitude/Elevation) to centimeter accuracy through a technology such as RTK. Thus, an elevation 135 can be determined for a point of interest 130 of the structure 100.

To measure the height of a point of interest the structure 100, one photo from the user device would suffice if the GPS receiver (or "rover receiver") was installed on a tripod of known. The user device application 290 can then detect the tripod in the photo and use the known height of the tripod as an increment to compare against the height of the structure 100 similar to a "tick" of a ruler. In some embodiments, the user device application 290 can calculate the elevation at the top of the structure 100 using the height calculated and the known elevation at the rover GPS receiver 175 reference point.

It is important that the photo clearly show a side of the structure 100 as well as the rover GPS receiver 175 and tripod in such an embodiment. The application 290 would identify/determine the associated level point on the rover tripod and calculate the offset height knowing a priori the elevation of the level camera on the base receiver (i.e, the elevation offset 115). This method of measuring the height 135 of a point of interest 130 may be particularly useful if the point of interest 130 of the structure 100 is be obscured by overhead trees, foliage, power lines, or the like thereby necessitating the making of an indirect measurements by using calculations from data obtained by photographing the point of interest from a location nearby and that has clear view of the GPS satellite constellations with an established location for reference (base or reference receiver).

In some embodiments, a different reference height is used instead of a tripod. For instance, a ruler, yardstick, meterstick, rod, or other vertical element of known height (i.e, the elevation offset 115) may be attached to the rover GPS receiver 175, or a appliqué or "sticker" can be attached to the structure 100 at a known distance (or a laser as described earlier) level to the elevation offset 115.

For most Government flood underwriting purposes, the height of a structurual 100 point(s) of interest is needed as is a single known GPS Latitude/Longitude (horizontal) measurement. The precise horizontal measurements can be obtained of the point of interest 130 if the distance between the base GPS receiver 170 and the rover GPS receiver 175 can be calculated/measured. The application 290 can estimate the distance between the base GPS receiver 170 and the rover GPS receiver 175 if the image taken by a leveled camera at or near the base GPS receiver 170 is in full view of the rover GPS receiver 175's tripod of known height (i.e, the elevation offset 115) and noting the angle that the camera was pointed in by reading the internal compass of user device 110.

Figure 7:
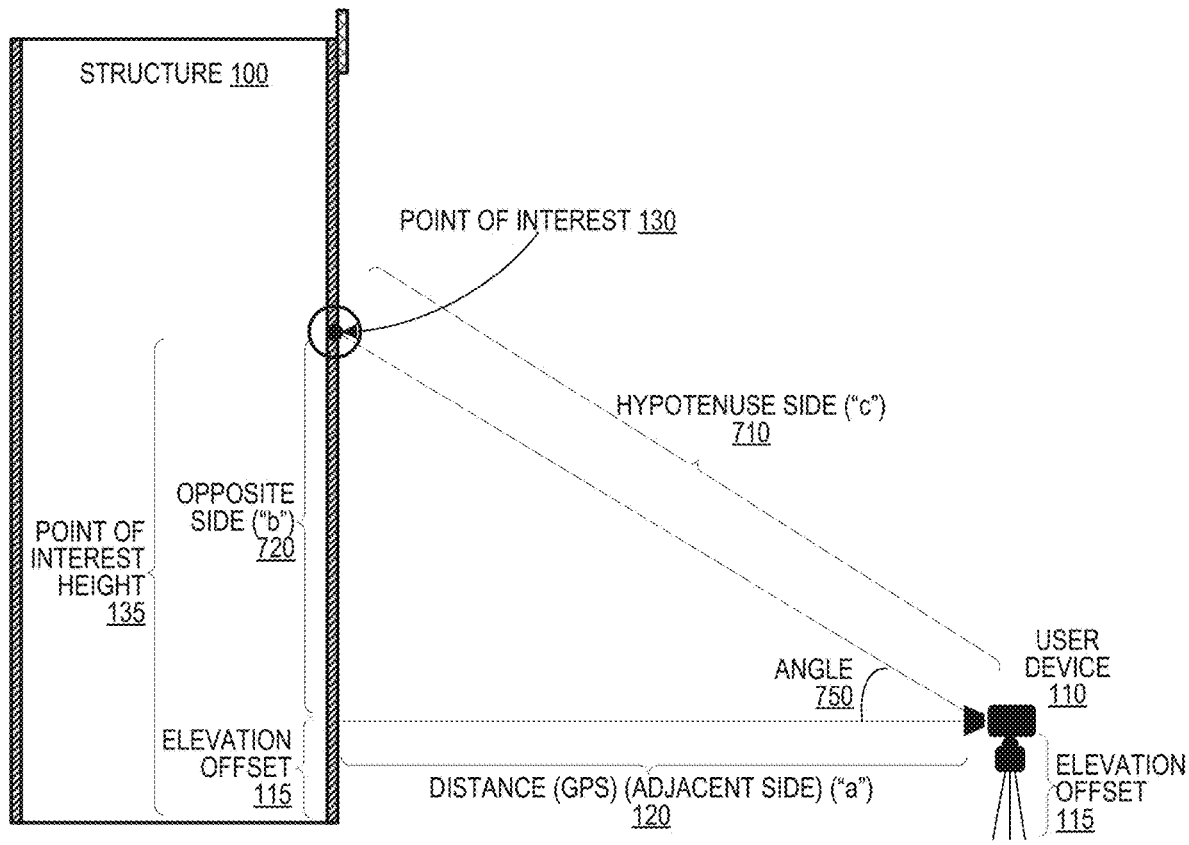
FIG. 7 illustrates trigonometric calculations used to determine a point of interest height.

A second measurement/photo needs to be taken by moving the base station (i.e., the user device 110 and base GPS receiver 170) to another known point and the process of obtaining the height and distance to the rover GPS receiver 175 along with the corresponding angle. Each height/distance/angle measurement permits a right triangle calculation to be performed as illustrated in FIG. 7. Knowing the inclination angle of the camera from a level staring position and the distance from the measurement point of interest to the Rover RTK GPS receiver, the elevation of the point of interest is calculated by the App using the formula shown in FIG. 7 and adding this value to the elevation offset 115. The intersection of the two measurement points results in an ellipse that the reference point is located within.

Although the precise height of the reference point will be known, with centimeter accuracy, the horizontal coordinates (X, Y/Lat, Long) will be less precise but wholly contained within the ellipse. Adding additional photos will shrink the size of the ellipse considerably and thus increase accuracy. In one embodiment of the present invention, an elliptical or circular error of probability calculation can be performed by the application 290 with confidence level set to a conservative level (such as 50%) to determine the horizontal coordinates of the point of interest 130. In other embodiments, the distance 120 between the two GPS receivers 170/175 can be calculated using the GPS coordinates returned by both instead of using the photo.

Signals from GPS satellites dither, or wander, over a 24-hour period. Some accuracy benefit can be obtained by utilizing GPS receivers 170/175 that communicate with more satellites and utilize faster processors to generate more accurate position measurements. To get even more precise position information, a user device 110 removes the dithering using error correction. In one embodiment, RTK and/or RTN error correction is utilized to minimize GPS dithering. Other techniques can also be employed.

The user device application 290, according to some embodiments of the present invention, can determine the distance 120 with precision from the base RTK GPS device 170 co-located with the User device 110 (smartphone/tablet, etc) to a measurement point of interest within the digital image. The user device application 290 can display this information to the user as a measurement value, with centimeter accuracy, and to have that information stored in memory. In some embodiments, this measurement information is directly, automatically inserted/populated into associated fields of the survey documents (such as the FEMA Elevation Certificate) within the user device application 290, running on a user device 110 or on a remote user computing device (e.g., a laptop computer or desktop computer that can connect to and synchronize measurement data with the user device) where a user 190 might later review, interact with, and edit data.

Typically the user 190 would be instructed to take one digital image of one location. Additional images can be taken depending on which sensor and which processor type was being used while the calculations and mathematical processing would be accomplished by the user device app 290 using the image and by processing the other additional sensor measurements that were taken at the same or similar time as the image. For example, the user 190 could use a laser measurement tool (or another tool identified above) embedded in or attached to the user device110, along with a measured electronic differential, to correct GPS RTK, RTN measurements. Thus, from a physical benchmark survey, a very accurate location in three dimensions can be obtained. The photo type can be a single digital image, 2D or 3D, or stereo digital image pair that the computer processes and provides the mathematical solution/calculated point from the reference site.

In some embodiments, the user device application 290, running on a user device 110, can be linked, wired or wirelessly, to a flying drone or remotely controlled flying device equipped with a camera. As described above regarding the user device 110, the flying drone or remote control flying device can carry additional sensors and allow measurements from these sensors to be integrated into calculations based on photos from the digital camera. For example, additional sensors can generate image positional information with respect to the object of interest in the photo through laser rangefinders, sonic echolocation or sonar sensors, radar sensors, acoustic sensors, and precision cell tower location triangulation. The photos can thus be captured through a camera on the ground or in the air.

In some embodiments, GPS corrections and other calculations can be received by the GPS receivers 170/175 and RTN. In some embodiments, the calculation process can be accomplished in real time on the user device app 290, running on user device 110. In other embodiments, the calculation process may be accomplished instead in post-processing, either on the user device 110 or on a remote user computing device. Such calculations can thus be used in order to pinpoint the precise location of objects within the digital image.

All Elevation Certificate information required is collected by the user device 110 through the user device application 290 at the property site. An "electronic" Elevation Certificate can then prepared by the user device application 290 in an electronic document format such as a Microsoft Word (DOC or DOCX) file, an Adobe Acrobat (PDF) file, a rich text format (RTF) file, a plain text file (TXT), or another format. The Elevation Certificate can be securely encrypted before or after storage by the user device application 290 within a memory 240 of the user device 110, a memory of a remote user computing device (e.g., laptop, desktop), or a memory of one or more secure cloud storage server(s) 160 accessible to the user device 110 through a network connection (e.g., internet 150).

In some embodiments, the Elevation Certificate is not encrypted. The Elevation Certificate can subsequently be transmitted to a third party's server either in an encrypted or unencrypted state. The third party may be, for example, an insurance underwriter, or a Realtor, a construction company, a title company, a local city government, a state government, the federal government, a government organization (e.g. FEMA), the property owner(s), the property manager(s), or some combination thereof. The third party may be given full access to download the elevation certificate locally into a memory of a server associated with the third party, or may be limited to viewing the elevation certificate through a third party interface (e.g., an internet/intrartet web page with an interface for third party access) while the elevation certificate is maintained at the secure cloud storage server(s) 160. The third party interface may be hosted by one or more server(s) associated with the secure cloud storage server(s) 160 or by one or more server(s) associated with the third party. Once the Elevation Certificate is transmitted to the secure cloud storage server(s) 160 and/or to the third party server(s), it can be held there for processing, review, rating, archiving, quoting, billing, and other government, insurance underwriting, or property-related tasks, for example performed through the third party interface, which may save time and reduce reliance on paper documents.

Figure 1B:
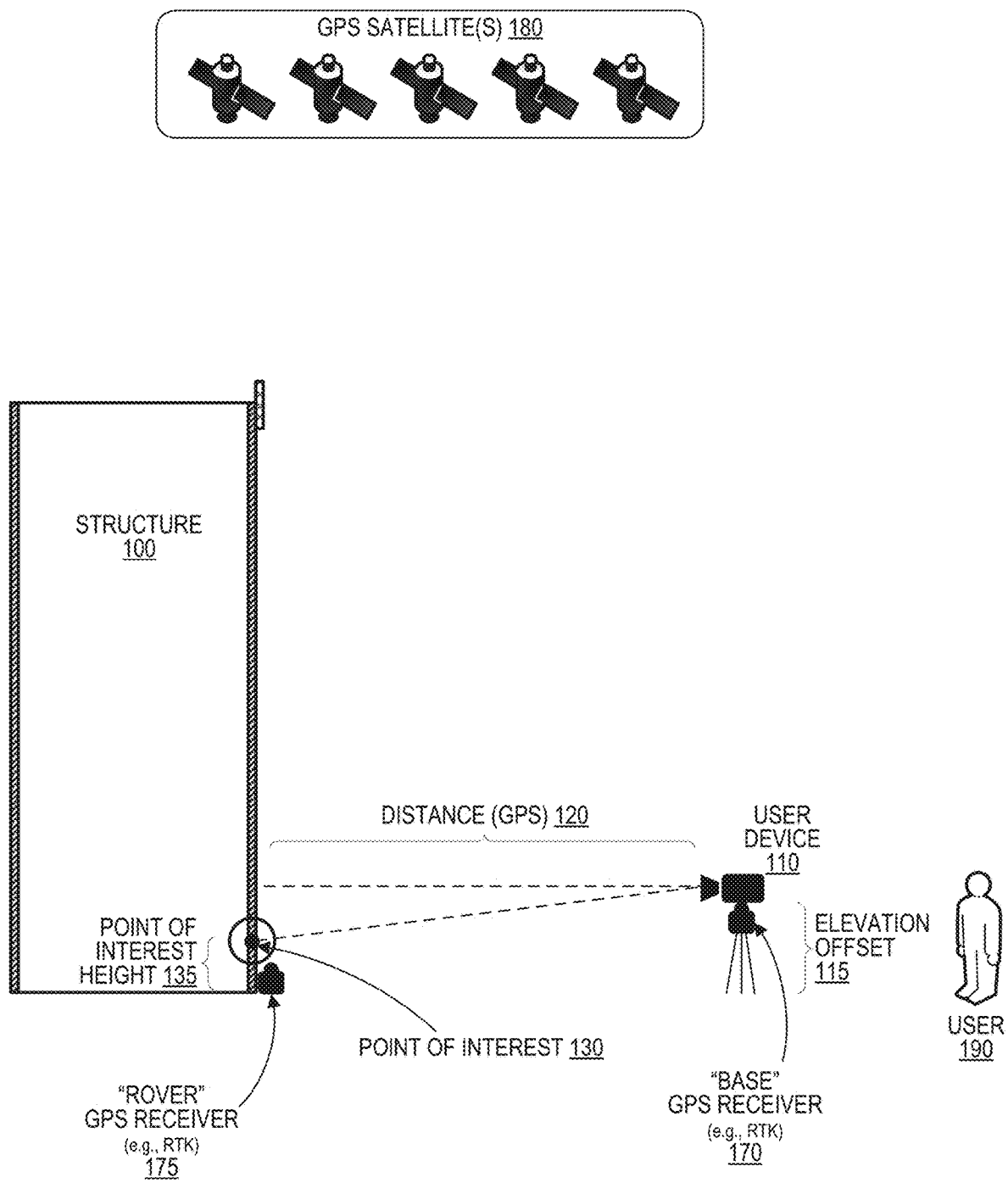
FIG. 1B illustrates a user device with a camera module and two global positioning system (GPS) receivers determining an elevation of a point of interest on a structure that is located below the user device.

FIG. 1B illustrates a user device with a camera module and two global positioning system (GPS) receivers determining an elevation of a point of interest on a structure that is located below the user device. A point of interest below the elevation of the user device 110 (i.e., the elevation offset 115) may represent, for example, a flood danger area. User of the system in the context of FIG. 1B is the same as that in FIG. 1A but for the elevation of the point of interest relative the user device.

Figure 2:
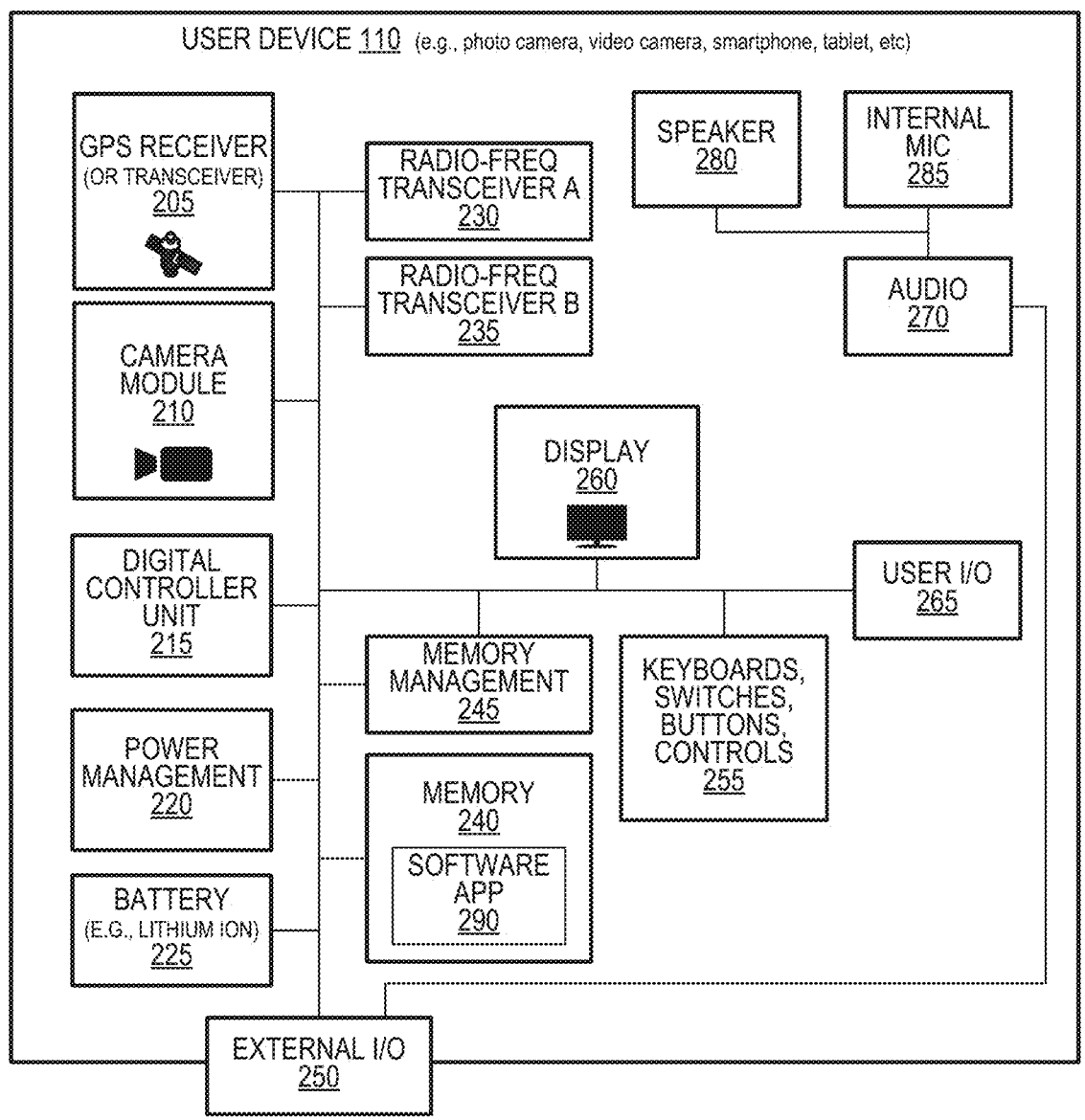
FIG. 2 illustrates an exemplary user device as may be used in the context of the present invention.

FIG. 2 illustrates an exemplary user device as may be used in the context of the present invention. The user device 110 of FIG. 2 includes a variety of interconnected components, which are intended to be illustrative rather than limiting. In the embodiment shown in FIG. 2, the user device 110 is a smartphone or tablet, and includes a memory 240 (with a software app 290), a memory management module 245, a battery 225, a power management module 220, an external I/O module 250, a display 260, an input ("keyboard, switches, controls" which may include touchscreen or gesture-based controls) 255, a user input/output (I/O) module 265, an audio module 270 with a speaker output 280 and/or internal microphone input 285, a digital controller unit 215, a camera module 210, a GPS receiver 205, a first radio-frequency (RF) transceiver ("Radio-Freq Transceiver A") 230, and a second radio-frequency (RF) transceiver ("Radio Freq Transceiver B") 235. In some embodiments, the user device includes only a single radio frequency transceiver.

Figure 3:
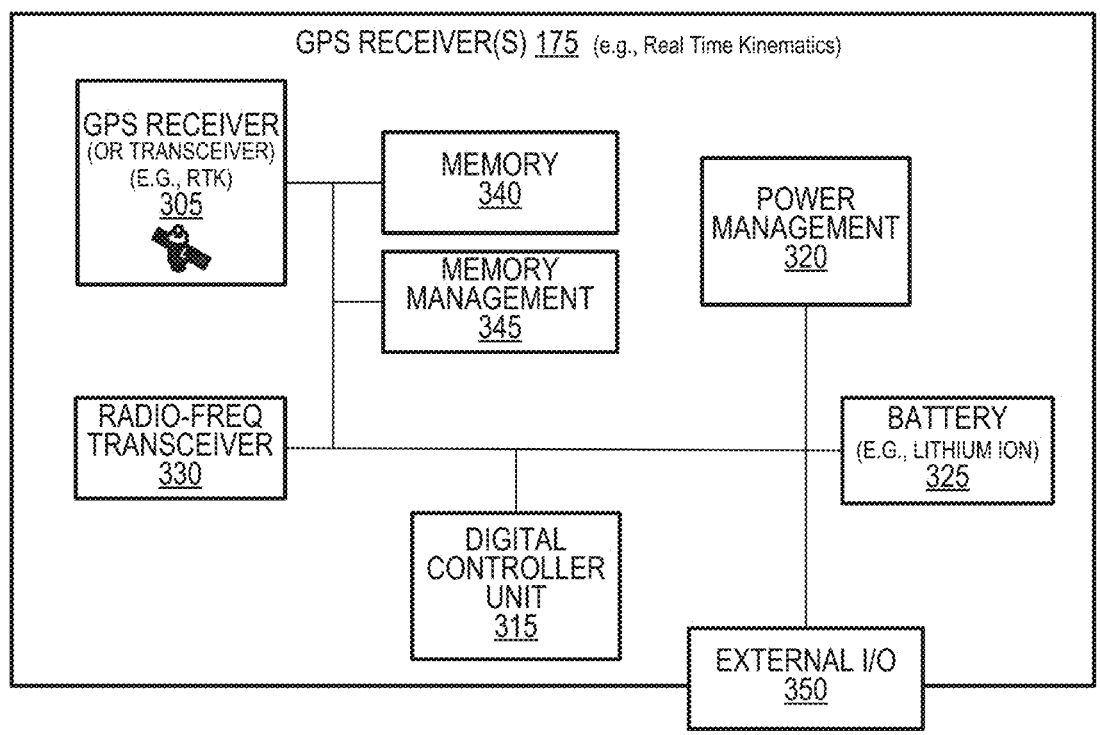
FIG. 3 illustrates an exemplary global positioning system (GPS) receiver.

FIG. 3 illustrates an exemplary global positioning system (GPS) receiver. The GPS receivers 170/175 of FIG. 2 include a variety of interconnected components, which are intended to be illustrative rather than limiting. In the embodiment shown in FIG. 2, the GPS receivers 170/175 are RTK GPS receivers 170/175, and include a memory 340, a memory management module 345, a battery 325, a power management module 320, an external input/output (I/O) module 350, a digital control unit 315, a radio frequency (RF) transceiver module 330, and a GPS RTK receiver module 305. The GPS receivers 170/175 communicate with a GPS satellite constellation 180 using at least the RTK GPS receiver module 305. The GPS receivers 170/175 communicate with the user device 110 using at least one of the External I/O module or the radio frequency transceiver 330. The base GPS receiver 170 may use a different radio frequency for its radio-frequency transmissions than the rover GPS receiver 175, which is why the user device 110 is illustrated in FIG. 2 as having two radio-frequency transceivers 130/135 (alternately, a single radio-frequency transceiver 130/135 could receive transmissions from both the base GPS receiver 170 and the rover GPS receiver 175).

In some embodiments, the GPS receivers 170/175 are RTK GPS receivers 170/175 in order to provide the improved accuracy that the document (e.g., FEMA Elevation Certificate or insurance form) may in some cases require (for example, FEMA Elevation Certificates require an accuracy of approximately 4 to 8 CM). In other embodiments, a different technology besides RTK may be used in order to ensure that the GPS receivers 170/175 are accurate enough.

While most user devices currently possess GPS modules, the accuracy is generally limited (usually to 10 meters). It is anticipated that user device accuracy will improve in the future, as the technology exists to produce it. However, the United States Government is limiting access to devices that directly produce this level of accuracy based upon security concerns, terrorism worries, and criminal activities. In the event that accurate user device GPS sensors become legally allowed and commercially feasible, the need for separate GPS receivers 170/175 (RTK or otherwise) may be made unnecessary, and the user device app could be used in place of one or both of the base GPS receiver 170 and rover GPS receiver 175, and gather this GPS input from the appropriate module internally to the user device itself.

As the User performs the steps, directed by the user device app, digital images are taken that are aimed at the point of reference on the structure 100 with the rover GPS receiver 175 in the photo. In some embodiments, a reflective or otherwise distinctive appliqué or "sticker" can be placed at the point of interest (e.g., on the wall of the structure 100) so that the post-processing algorithms, embedded in the app, can more easily determine the distance and geometries of the structure 100 using the precise location of the rover GPS receiver 175. The user device app 290 can calculates values such as the height of the structure 100 at a point of interest. The user device app 290 can then automatically enter the measured and calculated values into a document (e.g., FEMA Elevation Certificate form or insurance form) prepared for the structure 100.

The user device app 290 can, in some embodiments, prompt the User 190 to take additional digital images as needed to improve/finish the calculations or to help fill out a "photos" section of the document (e.g., FEMA Elevation Certificate form or insurance form). The user device app 290 may feature video, text, audio, graphical tutorials to aid the User 190 during this process. For example, the user device app 290 can execute such a tutorial if the user 190 has expressed confusion regarding what sort of photo to take, how to take the best quality or type of photo, what the next required measurement is, or other steps that the user 190 should take. In other embodiments, such a tutorial can be executed the first time the user device app 290 performs a measurement, with an option to disable the tutorials thereafter.

After the digital device app determines that all necessary information has been collected, the digital Elevation Certificate is, in one embodiment, displayed to the user 190 through the user device app 290 in a manner that allows the user 190 to review and/or edit the Elevation Certificate prior to transmitting the Elevation Certificate to the secure cloud storage server(s) and or third party server(s), either encrypted or not. In another embodiment, the Elevation Certificate is not displayed to the user 190 through the user device app 290, but is instead automatically transmitted to the secure cloud storage server(s) and or third party server(s).

Once received by the Underwriter, the Elevation Certificate file may be encrypted if it was not already. The encrypted file may be copied, with one copy being securely archived for possible future evidentiary use, and a "work"

copy is made that is opened by underwriting personnel. Normally, a Surveyor or Engineer must manually, physically "stamp" the Elevation Certificate if their measurement services are required. However, this accuracy and reliability of the system can be periodically validated, by Surveyors, thus eliminating the need for their stamp each and every time a survey is conducted. In addition, the seal or certification can be handled by stamping the location with touch screen technology in the form of a digital stamp certified by the authority to hold the stamp device. For example, a certified surveyor or engineer could digitally "stamp" each Elevation Certificate, or could periodically certify the accuracy of the system so that a "stamp" from the surveyor is not required for every Elevation Certificate. The stamp may include a checksum and/or a certificate verified by a certificate authority.

Images of the structure 100 with precise elevation values, along with a pinpointed location of a Flood Insurance Rate Map, can in some cases be used to augment the cost of a flood insurance quote, or to obtain a premium real estate value for the property and/or structure 100. Comparable insurance values for real estate in the immediate area can be used to automatically determine if secondary "excess" coverage is needed for the structure 100 and, a premium for that type of coverage can be automatically determined as well.

In some embodiments, insurance cost and/or property value quotes can be generated based on the Elevation Certificate or the data within it. In some embodiments, such quotes can be transmitted back to the agents, insured persons, potential insurance clients, potential property buyers, real estate agents, construction surveyors, government officials or other individuals. Such quotes can be transmitted encrypted or unencrypted via e-mail, text message, phone call, audio message, videoconference, or video message.

FIG. 4A illustrates a first exemplary page of an exemplary Elevation Certificate prior to being filled in with information from measurements. FIG. 4B illustrates a second exemplary page of an exemplary Elevation Certificate prior to being filled in with information from measurements. FIG. 4C illustrates a third exemplary page of an exemplary Elevation Certificate that has been filled in with information from measurements.

Figure 5:
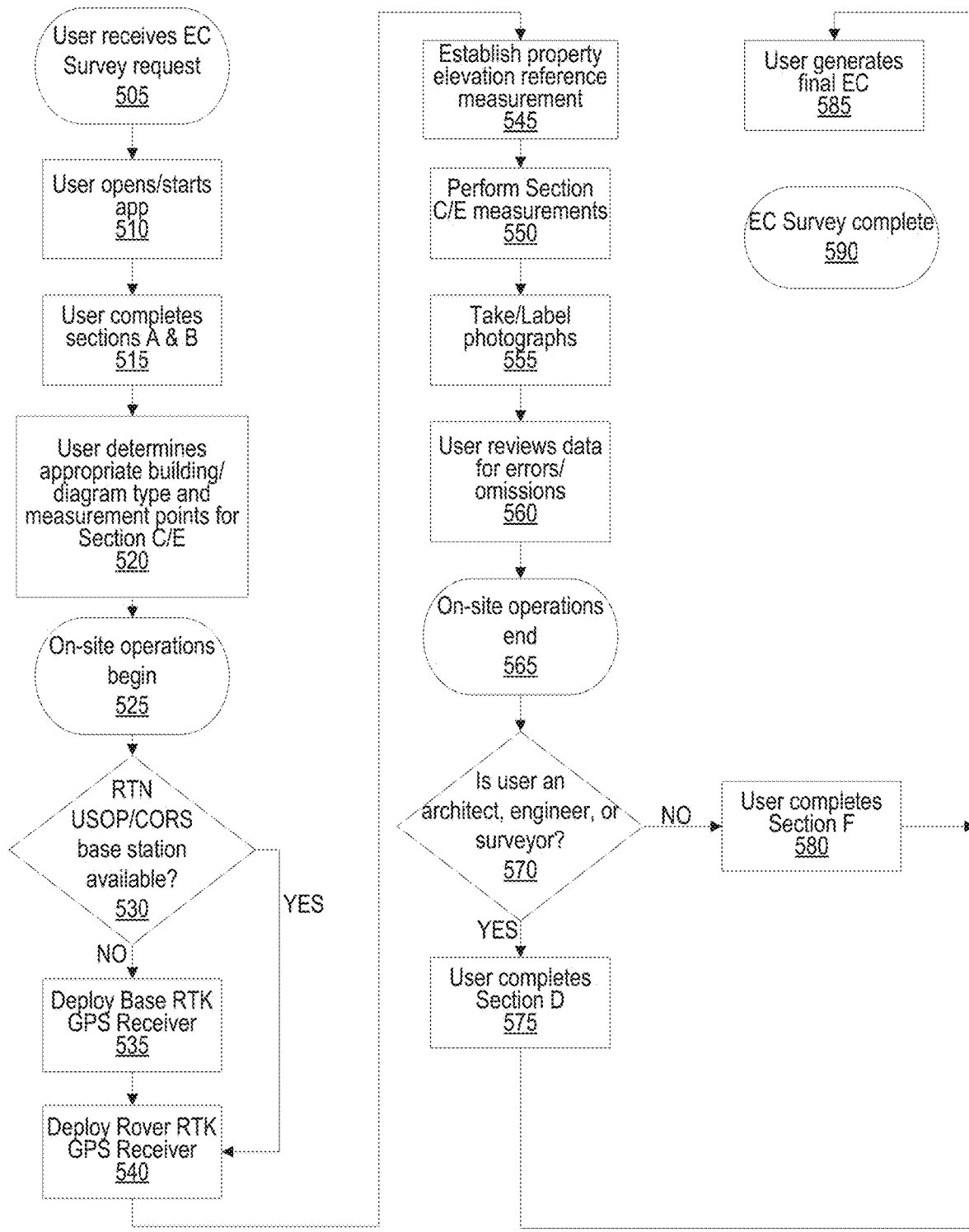
FIG. 5 is a flow diagram that illustrates exemplary operations of a measurement-capturing process and a document-generating process.

FIG. 5 is a flow diagram that illustrates exemplary operations of a measurement-capturing process and a document-generating process. In particular, FIG. 5 illustrates exemplary operations for capturing measurement and eventually producing a survey form such as the FEMA Elevation Certificate. In this embodiment, precision measurements are made utilizing either a single RTK GPS receiver and a Real Time Network (RTN) solution/Continuously Operating Reference Station (CORS) for On-line Positioning User Service (OPUS); or two RTK GPS receivers 170/175, and these measurements are recorded by the user device 110. The user device 110 then transfers these measurements to editable forms that are accessible on a separate user computer, where the user can review and edit the measurement and other data before converting the editable electronic forms into a finalized Elevation Certificate and transmitting the Elevation Certificate to the insurance underwriter's system. Alternately, these measurements can be reviewed and edited on the user device 110 and directly produce a finalized Elevation Certificate, transmitting it directly to the secure cloud storage server(s) 160 and/or third party (e.g. insurance underwriter or government agency) server(s) 165.

Figure 6A:
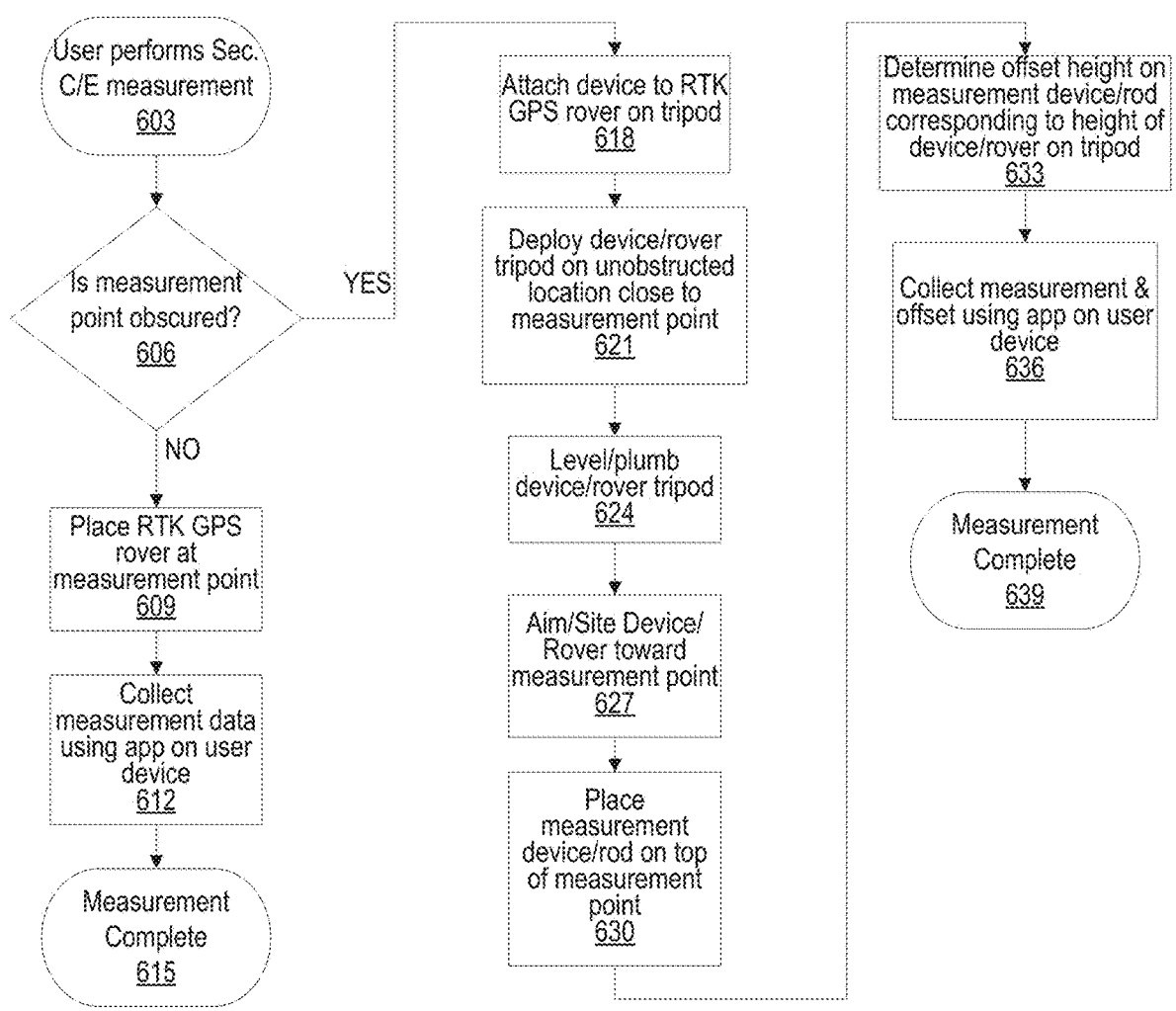
FIG. 6A is a flow diagram that illustrates exemplary operations for determining measurements when the distance between the rover global positioning system (GPS) receiver and the point of interest is known or readily obtainable.
Figure 6B:
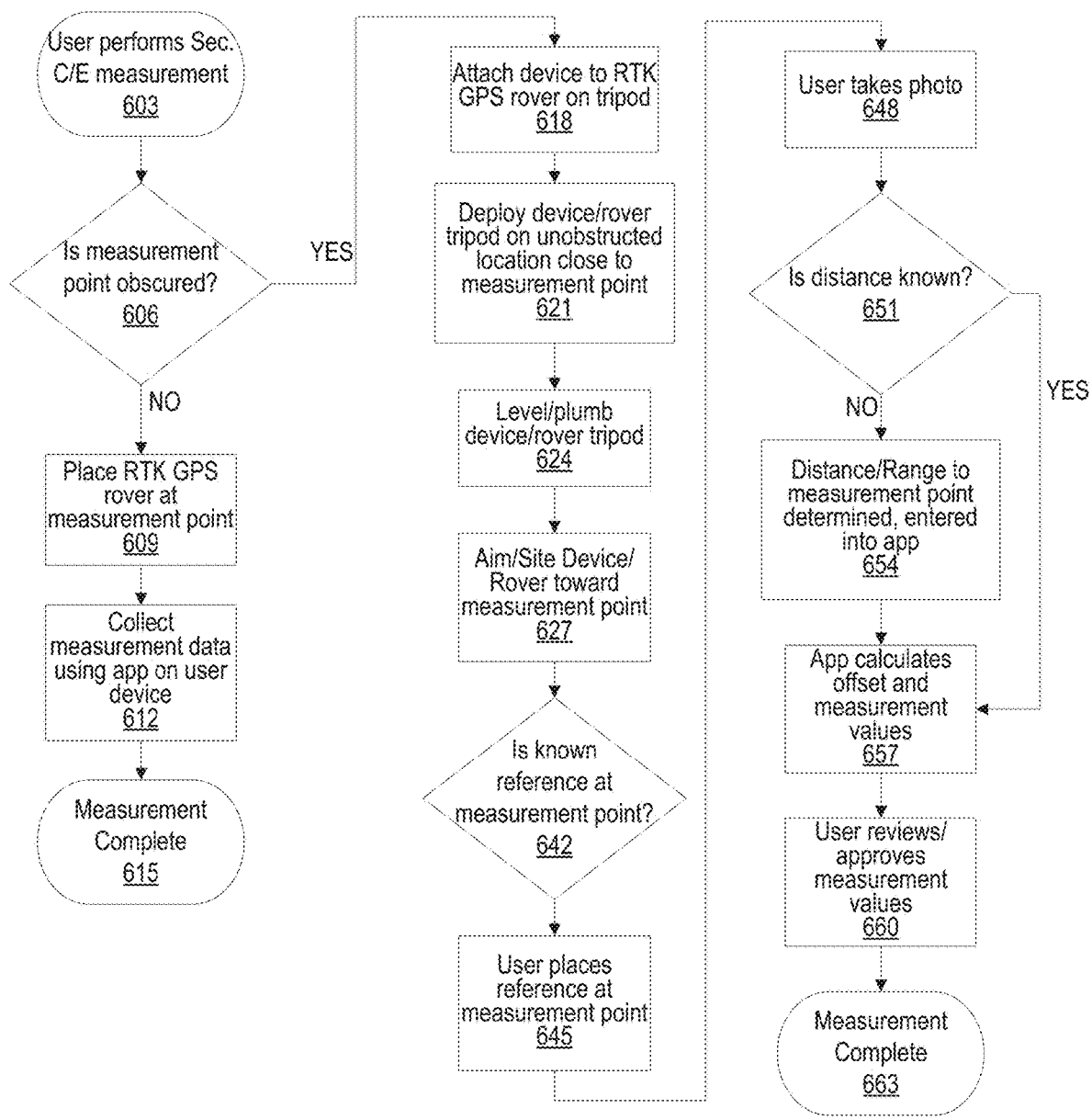
FIG. 6B is a flow diagram that illustrates exemplary operations for determining measurements using a photometric measurement technique.

FIG. 6A is a flow diagram that illustrates exemplary operations for determining measurements when the distance between the rover global positioning system (GPS) receiver and the point of interest is known or readily obtainable. This illustrates one example of how a User 190 could perform EC document Section C/E measurements, where the distance from the Rover RTK GPS receiver 175 and the measurement point of interest is known. FIG. 6B is a flow diagram that illustrates exemplary operations for determining measurements using a photometric measurement technique. This illustrates one example of how a User could perform EC document Section C/E measurements using photometric techniques that calculate the measurement points of interest based upon the insertion or presence of an object of exact known length in the photo. While the flow diagrams in FIG. 5, 6A, and 6B show a particular order of operations performed by certain embodiments of the invention, it should be understood that such order is exemplary (e.g., alternative embodiments can perform the operations in a different order, combine certain operations, overlap certain operations, etc.).

FIG. 7 illustrates trigonometric calculations used to determine a point of interest height. In the flow diagrams of both FIG. 6A and FIG. 6B, the offset elevation 115 of the measurement point of interest is the value of "b" of the side "opposite" in the Trigonometry equation for a right triangle illustrated in FIG. 7. Because the camera angle 750 is known along with the value "a", the distance to the measurement point of interest, the equation of the right triangle, illustrated in the calculations 780, is equal to the equations shown in the calculations 780, which can be solved for the height of the measurement point of interest. This value is calculated by the user app 290 as executed by the processor of the user device 110 and added to the known height of the Rover RTK GPS receiver 175. This process is repeated for each measurement point of interest, with values presented for the user 190 to review and approve and automatically populated within the associated field of the electronic document (e.g. the elevation certificate of FIG. 4A, FIG. 4B, FIG. 4C).

Figure 8A:
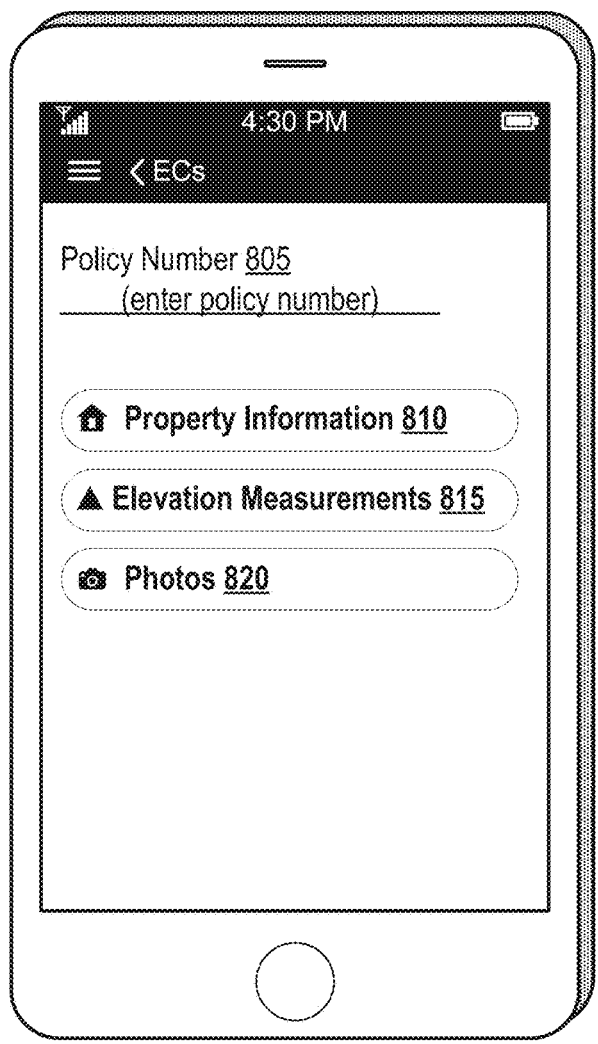
FIG. 8A illustrates an exemplary menu screen graphical user interface (GUI) of an exemplary user device app that is executed by the user device.

FIG. 8A illustrates an exemplary menu screen graphical user interface (GUI) of an exemplary user device app that is executed by the user device. According to this embodiment, the exemplary menu can search policy numbers (or alternately enter new policy numbers) via "Policy Number" field 805, and includes menu categories "Property Information" 810, "Elevation Measurements" 815, and "Photos" 820.

Figure 8B:
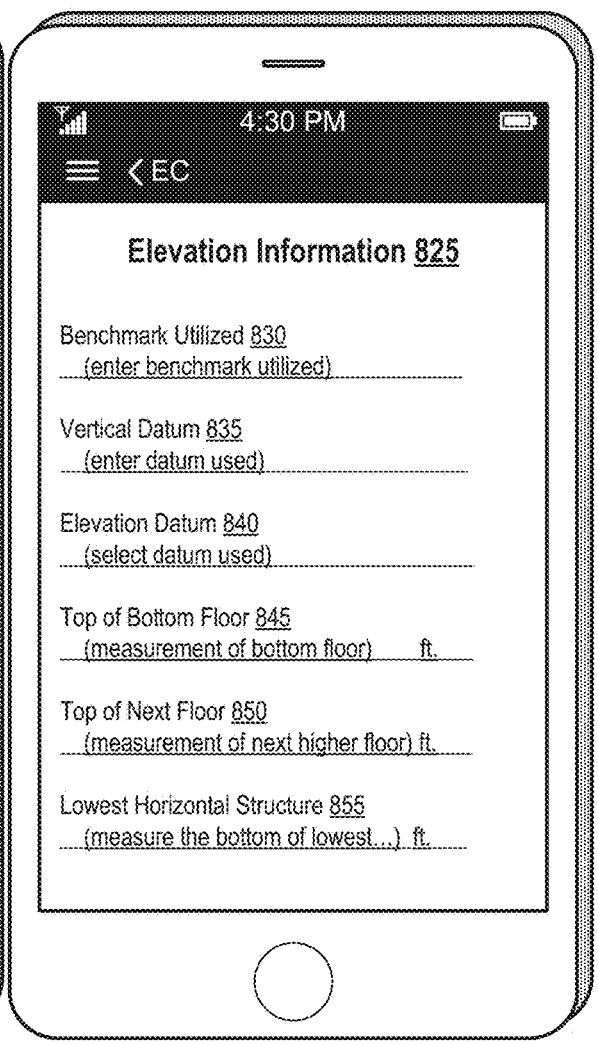
FIG. 8B illustrates an exemplary elevation information graphical user interface (GUI) of an exemplary user device app that is executed by the user device.

FIG. 8B illustrates an exemplary elevation information graphical user interface (GUI) of an exemplary user device app that is executed by the user device. According to this embodiment, the user interface can accept a "benchmark utilized" input 830, a "vertical datum" input 835, an "elevation datum" input 840, a "top of bottom floor" input 845 (e.g., in feet), a "top of next floor" input 850 (e.g., in feet), and a "lowest horizontal structure" input 855 (e.g., in feet).

The exemplary user interface of FIG. 8B shows blank fields, suggesting that a user has opened a new project and not yet performed any measurements. After a measuring process as described in relation to FIG. 1A, FIG. 1B, FIG. 2, FIG. 3, FIG. 5, FIG. 6A, FIG. 6B, and FIG. 7, this user interface can be automatically filled in using data collected through the measurements of the user device 110 app 290 and the GPS receivers 170/175. Alternately, the user can use an input method (e.g., keyboard, mouse, touchscreen, or gesture) of the user device 110 in order to fill in known measurements (e.g., if the user already knows the distance to the top of the next floor, the user can input this into the blank field).

Figure 9:
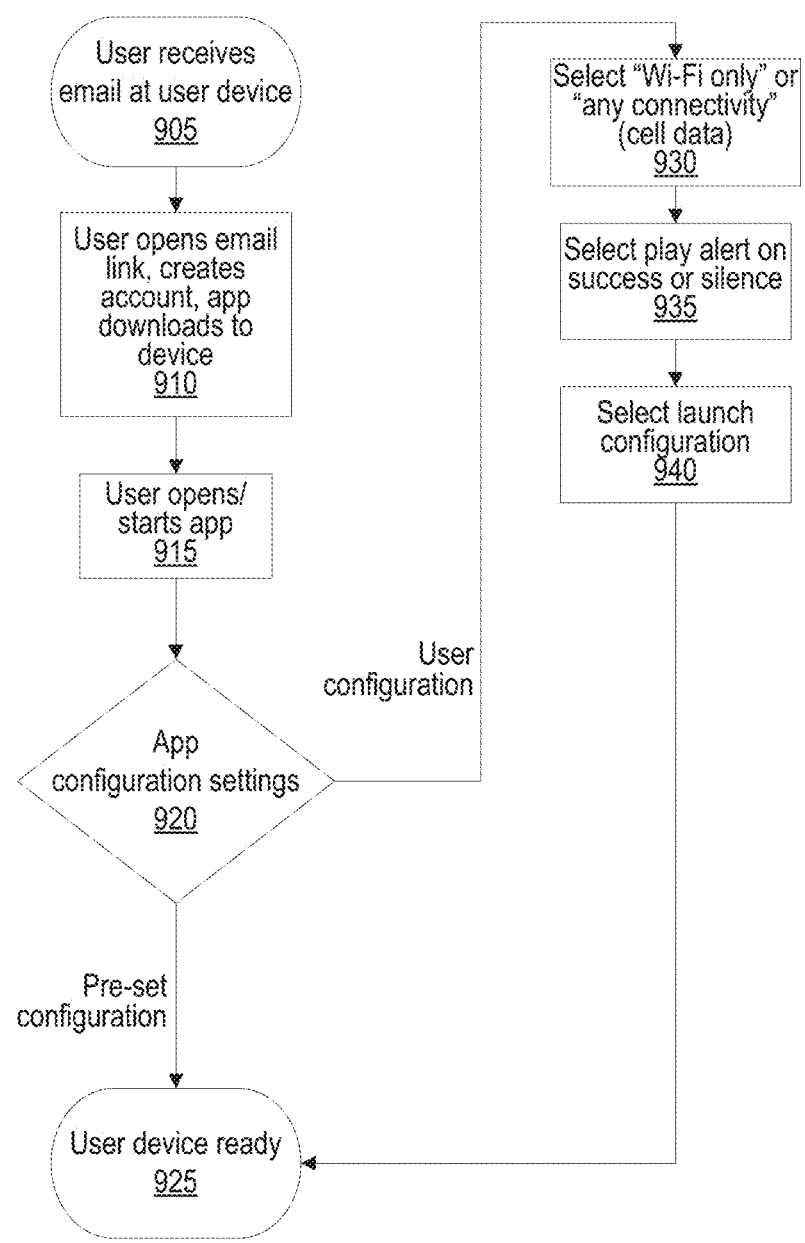
FIG. 9 is a flow diagram that illustrates exemplary operations for configuring the user device.

FIG. 9 is a flow diagram that illustrates exemplary operations for configuring the user device. In particular, FIG. 9 illustrates the user device 110 application 290 being downloaded onto the user device 110, and allowing the user device 110 to describe the property, incorporate measurement points of interest, and add photos. While the flow diagram in FIG. 9 shows a particular order of operations performed by certain embodiments of the invention, it should be understood that such order is exemplary (e.g., alternative embodiments can perform the operations in a different order, combine certain operations, overlap certain operations, etc.).

Figure 10A:
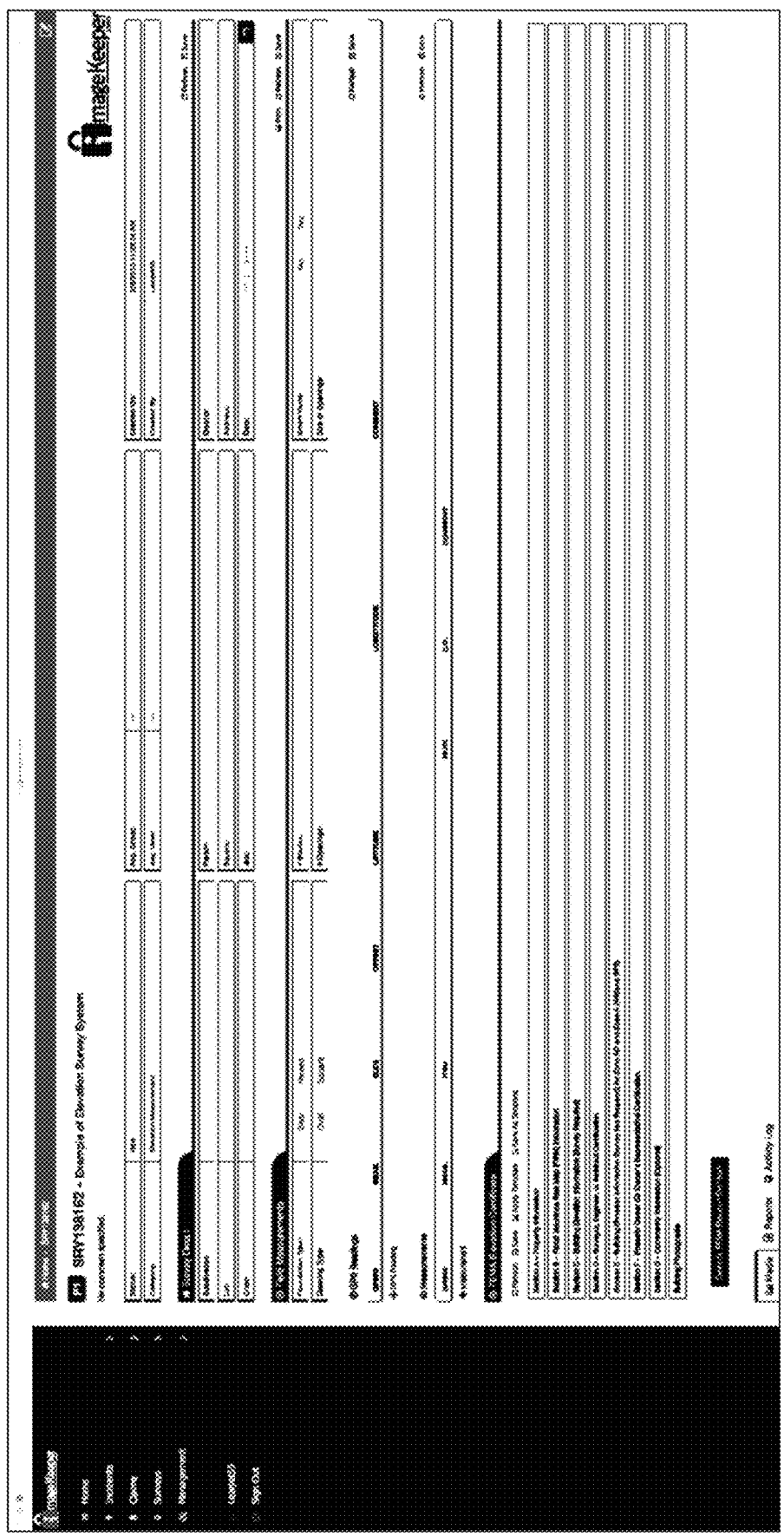
FIG. 10A illustrates a first graphical user interface (GUI) that can be used for filling in known elevation data for a new Elevation Certificate, or for reviewing/editing elevation data that has been automatically generated by the user device app and GPS receivers.

FIG. 10A illustrates a first graphical user interface (GUI) that can be used for filling in known elevation data for a new Elevation Certificate, or for reviewing/editing elevation data that has been automatically generated by the user device app and GPS receivers.

Figure 10B:
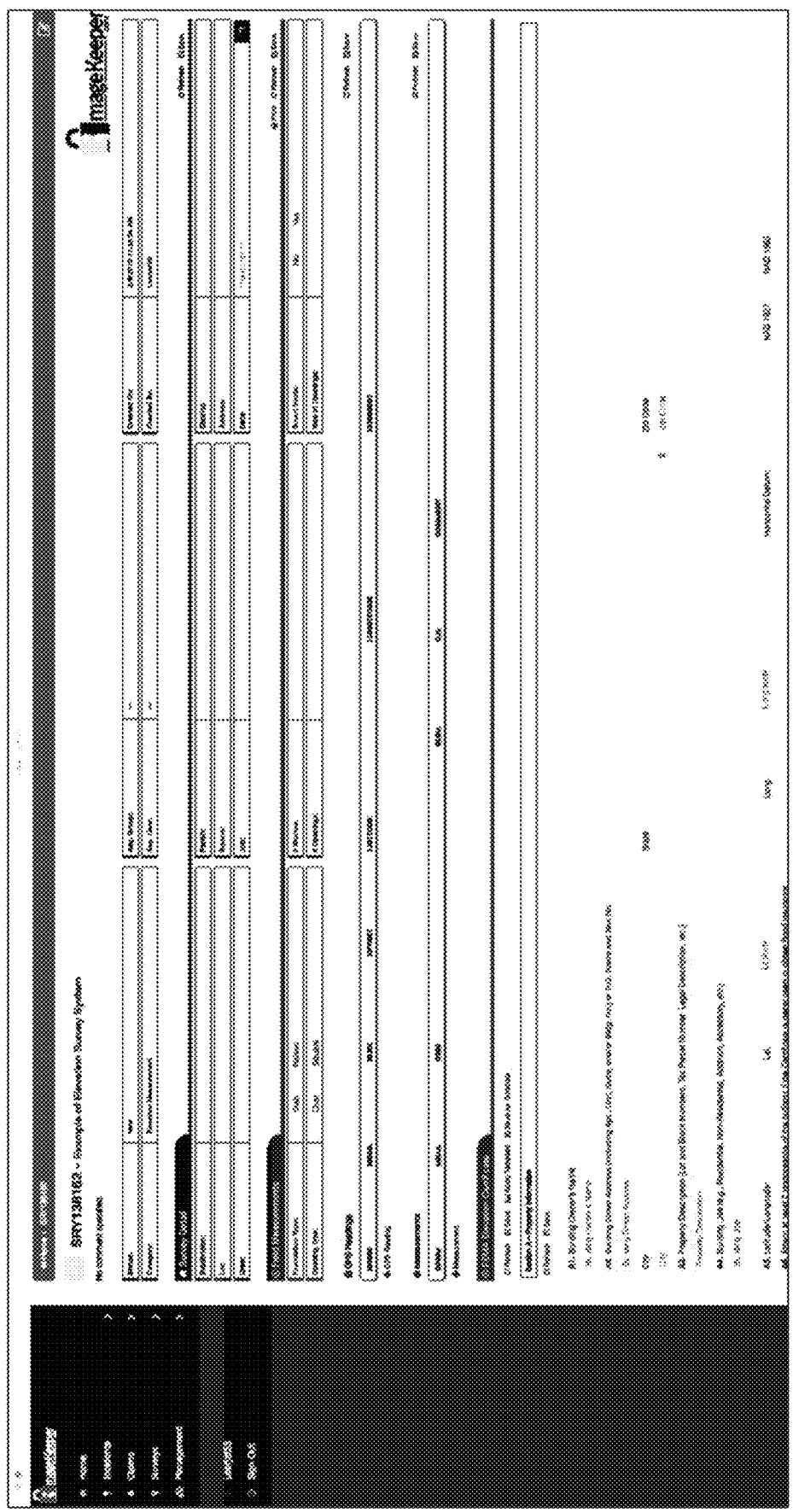
FIG. 10B illustrates a second graphical user interface (GUI) that can be used for filling in known elevation data for a new Elevation Certificate, or for reviewing/editing elevation data that has been automatically generated by the user device app and GPS receivers.

FIG. 10B illustrates a second graphical user interface (GUI) that can be used for filling in known elevation data for a new Elevation Certificate, or for reviewing/editing elevation data that has been automatically generated by the user device app and GPS receivers.

Figure 10C:
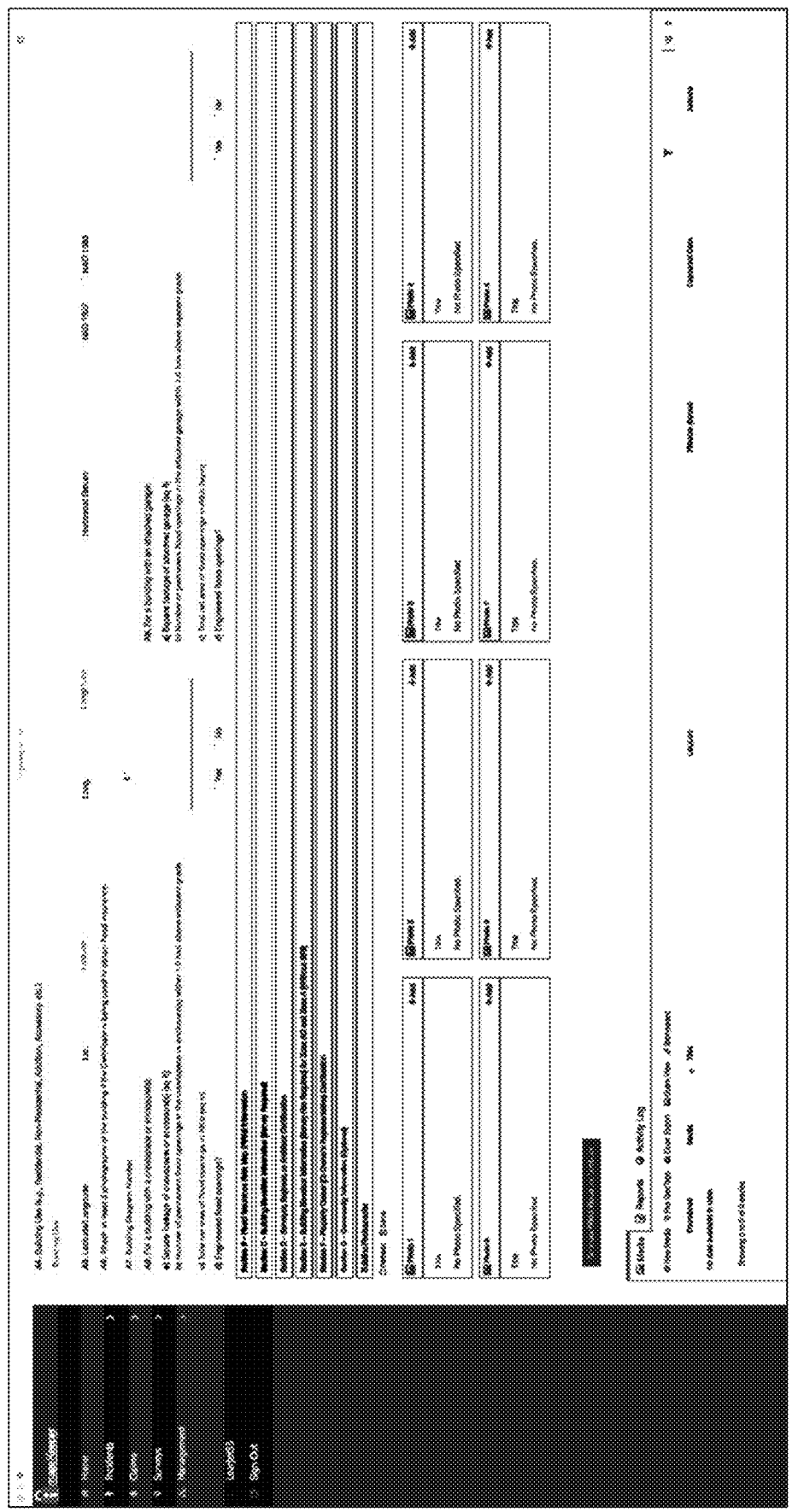
FIG. 10C illustrates a third graphical user interface (GUI) that can be used for filling in known elevation data for a new Elevation Certificate, or for reviewing/editing elevation data that has been automatically generated by the user device app and GPS receivers.

FIG. 10C illustrates a third graphical user interface (GUI) that can be used for filling in known elevation data for a new Elevation Certificate The exemplary user interfaces illustrated in FIG. 10A, FIG. 10B, and FIG. 10C be shown on the user device 110, or may alternately be an interface to be shown on a remote user computing device, such as a laptop computer or a desktop computer. In some embodiments, the user interfaces may be accessible through a web portal, such as a website. In some embodiments, the user interfaces FIG. 10A, FIG. 10B, and FIG. 10C may automatically synchronize data with a user interface on a user device 110 similar to the one shown in FIG. 8B.

The user interfaces shown in FIG. 10A, FIG. 10B, and FIG. 10C, show blank fields, suggesting that a user has opened a new project and not yet performed any measurements. After a measuring process as described in FIG. 6A and FIG. 6B, this user interface can be automatically filled in using data collected through the measurements of the user device app and the GPS receivers 170/175. Alternately, the user can use an input method (e.g., keyboard, mouse, touchscreen, or gesture) of the user device or of the remote user computing device in order to fill in known measurements (e.g., if the user already knows the height of the structure 100, the user can input this into the blank field).

Figure 11:
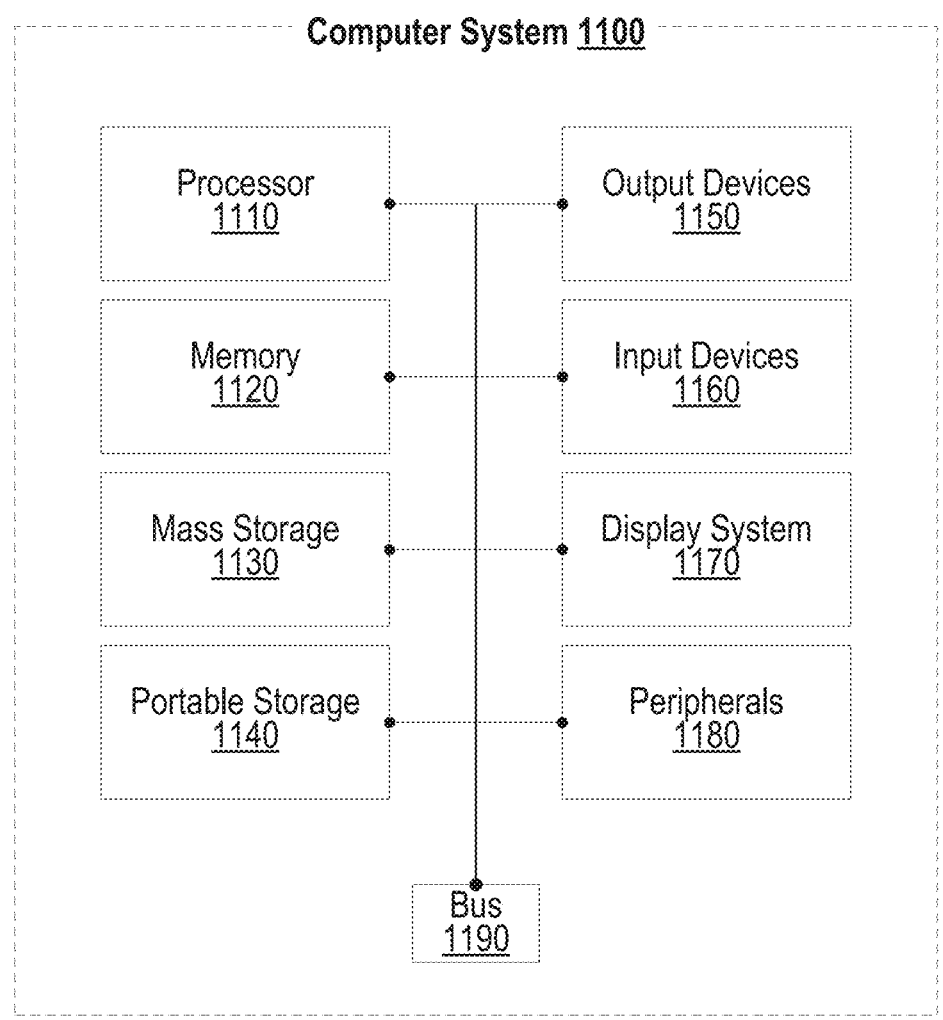
FIG. 11 is a block diagram of an exemplary computing device that may be used to implement an embodiment of the present invention.

FIG. 11 illustrates an exemplary computing system 1100 that may be used to implement an embodiment of the present invention. For example, any of the computer systems or computerized devices described herein may, in at least some cases, be a computing system 1100. The computing system 1100 of FIG. 11 includes one or more processors 1110 and memory 1110. Main memory 1110 stores, in part, instructions and data for execution by processor 1110. Main memory 1110 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1110 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing embodiments of the present invention for purposes of loading that software into main memory 1110.

Portable storage device 1140 operates in conjunction with a portable non-volatile storage medium, such as a floppy disk, compact disk or Digital video disc, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Examples of suitable output devices include speakers, printers, network interfaces, and monitors.

Display system 1170 may include a liquid crystal display (LCD), a plasma display, an organic light-emitting diode (OLED) display, an electronic ink display, a projector-based display, a holographic display, or another suitable display device. Display system 1170 receives textual and graphical information, and processes the information for output to the display device. The display system 1170 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1180 may include any type of computer support device to add additional functionality to the computer system. For example, peripheral device(s) 1180 may include a modem or a router.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 1100 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 1100 may be part of a multi-computer system that uses multiple computer systems 1100 (e.g., for one or more specific tasks or purposes). For example, the multi-computer system may include multiple computer systems 400 communicatively coupled together via one or more private networks (e.g., at least one LAN, WLAN, MAN, or WAN), or may include multiple computer systems 1100 communicatively coupled together via the internet (e.g., a "distributed" system), or some combination thereof.

The processes or methods depicted in the preceding figures can be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for property measurement, the method comprising:
    receiving a first location from a first global positioning system (GPS) receiver coupled to a user device;
    receiving a second location from a second GPS receiver located near a structure that extends from a surface, wherein the second GPS receiver is raised above the surface by a height;
    calculating a distance between the first location and the second location;
    receiving, from a camera associated with the user device, a digital photograph depicting at least one side of the structure and a point of interest that is part of the structure;
    calculating an elevation of the point of interest at least in part by using the height that the second GPS receiver is raised above the surface, an angle associated with the camera, and the calculated distance as values in one or more equations, and by using the digital photograph;
    storing the calculated elevation of the point of interest in a memory of the user device;
    generating an electronic document that includes the calculated elevation of the point of interest; and
    encrypting the electronic document.

2. The method of claim 1, further comprising storing the electronic document in the memory of the user device.

3. The method of claim 1, further comprising transmitting the electronic document to one or more cloud storage servers via a network connection.

4. The method of claim 1, further comprising transmitting the electronic document to one or more third party servers using a network connection, wherein the one or more third party servers are associated with at least one of a plurality of entities, the plurality of entities including Federal Emergency Management Agency (FEMA), another federal government entity, a state government entity, a municipal government entity, an insurance company, an insurance underwriter, a property owner, a property surveyor, and a property manager.

5. The method of claim 1, wherein the electronic document is at least one of a plurality of document types, the plurality of document types including a Federal Emergency Management Agency (FEMA) Elevation Certificate (EC) form, another government document, an insurance document, a property surveying document, a property ownership document, and a property management document.

6. The method of claim 1, wherein the first GPS receiver determines the first location, and the second GPS receiver determines the second location, using at least one of Real Time Kinematics (RTK) and Real Time Networking (RTN).

7. The method of claim 1, wherein the point of interest is located on an exterior side of the structure.

8. The method of claim 1, wherein the point of interest is located within the structure.

9. The method of claim 1, wherein the point of interest includes at least a portion of a rooftop of the structure.

10. The method of claim 1, wherein the user device is communicatively coupled to the first GPS receiver and the second GPS receiver wirelessly using at least one of a plurality of wireless communication interfaces, the plurality of wireless communication interfaces including a Bluetooth connection, a radio-frequency connection, a Wi-Fi connection, a wireless local area network (WLAN) connection, and a cellular telephone network connection.

11. The method of claim 1, wherein the user device is coupled to the first GPS receiver using at least one cable.

12. The method of claim 1, wherein the second GPS receiver is raised above the surface by the height using a mount.

13. A system for property measurement, the system comprising:
    a first global positioning system (GPS) receiver located near a structure that extends from a surface, wherein the first GPS receiver is raised above the surface by a height;
    a second GPS receiver located farther from the structure than the first GPS receiver;
    a communication transceiver;
    a camera coupled to the second GPS receiver;
    a memory; and
    a processor coupled to the memory and the camera and the communication transceiver, wherein execution of instructions stored in the memory by the processor causes the processor to:
        receive a first location from the first GPS receiver at the communication transceiver,
        receive a second location from the second GPS receiver at the communication transceiver,
        calculate a distance between the first location and the second location,
        receive a digital photograph from the camera, the digital photograph depicting at least one side of the structure and a point of interest that is part of the structure,
        calculate an elevation of the point of interest at least in part by using the height that the second GPS receiver is raised above the surface, an angle associated with the camera, and the calculated distance as values in one or more equations, and by using the digital photograph,
        store the calculated elevation of the point of interest in the memory, generate an electronic document that includes the calculated elevation of the point of interest, and
encrypt the electronic document.

14. The system of claim 13, further comprising one or more cloud storage servers, wherein execution of the instructions by the processor further transmits the generated electronic document to the one or more cloud storage servers using the communication transceiver.

15. The system of claim 13, wherein at least one of the camera and the second GPS receiver is raised above the surface by a second height using a first mount.

16. The system of claim 13, wherein the first GPS receiver is raised above the surface by the height using a mount.

17. The system of claim 13, further comprising a laser pointer that shines a laser point onto at least the one side of the structure that is depicted in the digital photograph, wherein calculating the elevation of the point of interest includes also using a position of the laser point in the digital photograph as one of the values in the one or more equations.

18. The system of claim 13, further comprising one or more third party servers, wherein execution of the instructions by the processor further transmits the generated electronic document to the one or more third party servers via the communication transceiver, wherein the one or more third party servers are associated with at least one of a plurality of entities, the plurality of entities including Federal Emergency Management Agency (FEMA), another federal government entity, a state government entity, a municipal government entity, an insurance company, an insurance underwriter, a property owner, a property surveyor, and a property manager.

19. The system of claim 13, wherein the structure includes at least part of one of a plurality of structure types, the plurality of structure types including a house, an apartment complex, a condominium complex, a townhouse, an office building, a warehouse, a factory, a power plant, a hangar, a garage, a radio tower, a cellular telephone network tower an electrical tower, a lighthouse, a structural tower, a statue, a modern art installation, a tree, and a wind turbine.

20. A non-transitory computer-readable storage medium, having embodied thereon a program executable by a processor to perform a method for property measurement, the method comprising:
  receiving a first location from a first global positioning system (GPS) receiver coupled to a camera;
  receiving a second location from a second global positioning system (GPS) receiver located near a structure that extends from a surface, wherein the second GPS receiver is raised above the surface by a height;
  calculating a distance between the first location and the second location;
  receiving, from the camera, a digital photograph depicting at least one side of the structure and a point of interest that is part of the structure;
  calculating an elevation of the point of interest at least in part by using the height that the second GPS receiver is raised above the surface, an angle associated with the camera, and the calculated distance as values in one or more equations, and by using the digital photograph;
  storing the calculated elevation of the point of interest in a memory;
  generating an electronic document that includes the calculated elevation of the point of interest; and
  encrypting the electronic document.

21. The method of claim 1, wherein generating the electronic document includes retrieving a form electronic document from a server and automatically populating one or more fields of the form electronic document to include the calculated elevation of the point of interest.

* * * * *